United States Patent [19]
Hicks et al.

[11] 3,752,036
[45] Aug. 14, 1973

[54] PROGRAMMABLE FLUIDIC LOGIC CONTROLLED MACHINE TOOL

[75] Inventors: Morris R. Hicks, Brook Park; Joseph C. Le Veque, Cleveland, both of Ohio

[73] Assignee: Bardons & Oliver, Inc., Cleveland, Ohio

[22] Filed: June 23, 1970

[21] Appl. No.: 49,098

[52] U.S. Cl. .................................. 90/13 C, 91/37
[51] Int. Cl. ............................................ B23c 1/00
[58] Field of Search .................. 83/71, 399; 234/89, 234/33, 34; 91/35, 37, 388, 364; 90/13 C

[56] References Cited
UNITED STATES PATENTS

| | | | |
|---|---|---|---|
| 3,475,996 | 11/1969 | Wheeler | 91/37 X |
| 3,606,817 | 9/1971 | Langley | 91/37 |
| 3,463,051 | 8/1969 | Jones et al. | 91/37 X |
| 3,415,163 | 12/1968 | Seivemon Inaba et al. | 91/388 X |
| 3,174,406 | 3/1965 | Hague et al. | 91/37 X |
| 3,198,084 | 8/1965 | Hague et al. | 91/37 |
| 3,583,281 | 6/1971 | Hicks et al. | 90/13 C |

Primary Examiner—Andrew R. Juhasz
Assistant Examiner—Z. R. Bilinsky
Attorney—Bosworth, Sessions, Herrstrom & Cain

[57] ABSTRACT

A program controlled automatic machine tool having three carriages respectively movable parallel to X, Y and Z axes that are perpendicular to each other. The X and Y carriages are horizontally movable along their respective axes to position a workpiece with respect to a cutting tool carried by the vertically movable Z carriage. A program on a suitable input record, such as punched paper tape, comprises a sequence of multidigit X-position instructions and Y-position instructions as well as a Z-carriage motion instruction and suitable ancillary instructions. Each X and Y position instruction is entered into a fluid logic circuit that controls movement of the corresponding X or Y carriage. The carriages are commanded by the fluid logic circuits to move to the instructed positions. Position transducers associated with the respective X and Y carriages provide information to the fluid logic circuits as to the carriage positions. The carriage positions are compared to the position instructions and when correspondence is obtained for both X and Y carriages the Z carriage is enabled to cause a cut to be made in the workpiece. The procedure is repeated until all instructions in the sequence have been carried out.

25 Claims, 37 Drawing Figures

Patented Aug. 14, 1973   3,752,036

INVENTORS.
MORRIS R. HICKS
BY JOSEPH C. LE VEQUE
Bosworth, Sessions,
Herrstrom & Cain
ATTORNEYS Patented Aug. 14, 1973
3,752,036
14 Sheets-Sheet 2
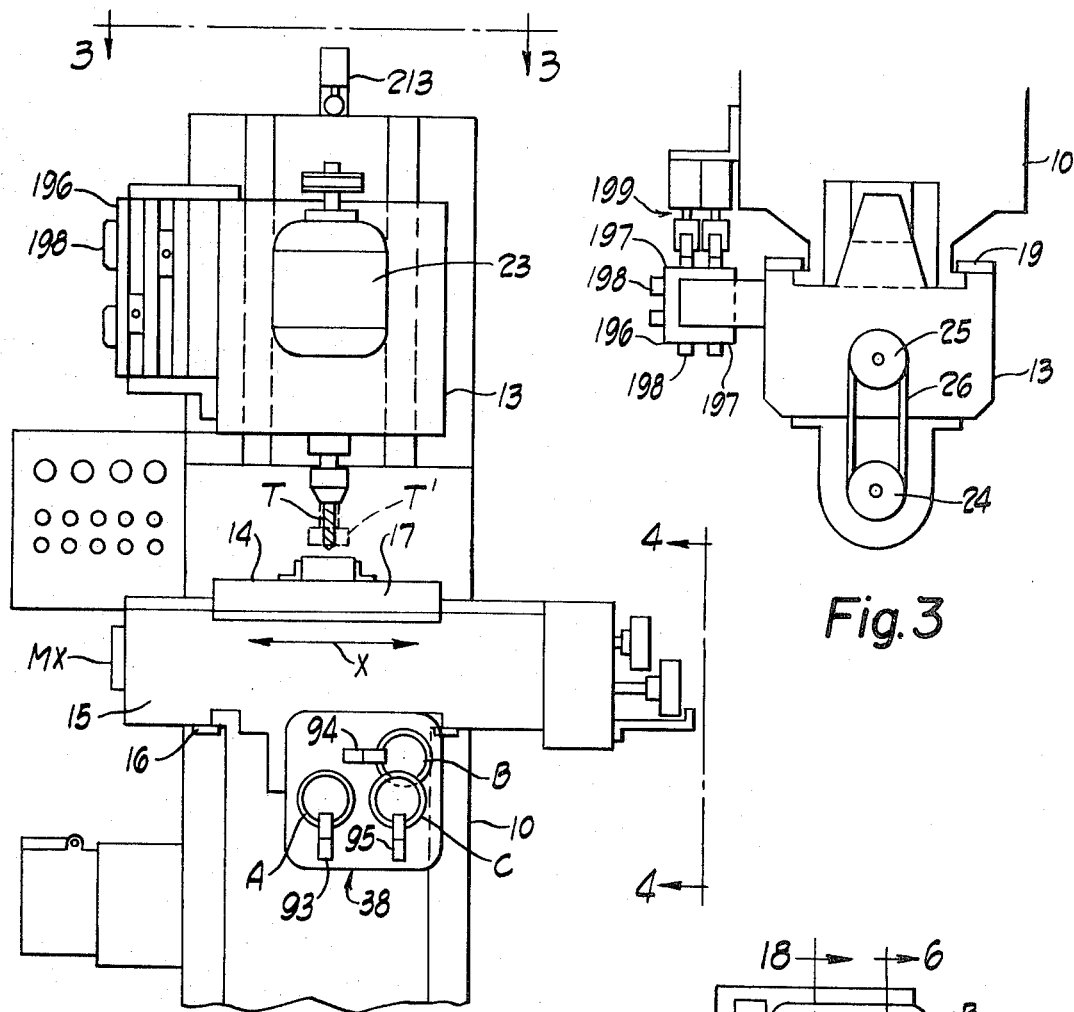
Fig. 2
Fig. 3
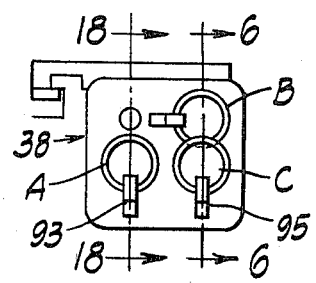
Fig. 4
INVENTORS
MORRIS R. HICKS
JOSEPH C. LE VEQUE
BY Bosworth, Sessions
Herrstrom & Cain
ATTORNEYS.

Patented Aug. 14, 1973

INVENTORS.
MORRIS R. HICKS
JOSEPH C. LE VEQUE
BY Bosworth, Sessions,
Herrstrom & Cain
ATTORNEYS INVENTORS
MORRIS R. HICKS
JOSEPH C. LE VEQUE
BY Bosworth, Sessions,
Herrstrom & Cain
ATTORNEYS.

Patented Aug. 14, 1973

INVENTORS.
MORRIS R. HICKS
JOSEPH C. LE VEQUE
BY Bosworth, Sessions,
Herrstrom & Cain
ATTORNEYS INVENTORS.
MORRIS R. HICKS
BY JOSEPH C. LE VEQUE
Bosworth, Sessions,
Herrstrom & Cain
ATTORNEYS.

Fig. 23

TYPICAL SEQUENCE WHEN MACHINE IS USED FOR DRILLING

| | INFORMATION BLOCK NUMBER | | | | | | | |
|---|---|---|---|---|---|---|---|---|
| | 1 | 2 | 3 | 4 | 5 | 6 | 7 | 8 |
| ROW 1  X MOTION N5 DIGIT | 6 | 6 | 6 | 6 | 1 | | | |
| ROW 2  X MOTION N4 DIGIT | 5 | 5 | 5 | 5 | 4 | | | |
| ROW 3  X MOTION N3 DIGIT | 5 | 5 | 5 | 5 | 0 | | | |
| ROW 4  X MOTION N2 DIGIT | 0 | 7 | 7 | 7 | 0 | | | |
| ROW 5  X MOTION N1 DIGIT | 0 | 5 | 5 | 5 | 0 | | | |
| ROW 6  X MOTION DIRECTION OF TRAVEL - PLUS-MINUS | PLUS | PLUS | PLUS | PLUS | MINUS | | | |
| ROW 7  X MOTION RATE OF TRAVEL - RAPID-SLOW | RAPID | SLOW | SLOW | SLOW | RAPID | | | |
| ROW 8  X MOTION BRAKE - ON-OFF | OFF | OFF | OFF | OFF | OFF | | | |
| ROW 9  X MOTION AFTER X NULL, BRAKE ON-OFF | OFF | ON | ON | ON | OFF | | | |
| ROW 10 Y MOTION N5 DIGIT | 0 | 0 | 0 | 0 | 0 | | | |
| ROW 11 Y MOTION N4 DIGIT | 8 | 8 | 8 | 8 | 7 | | | |
| ROW 12 Y MOTION N3 DIGIT | 3 | 3 | 3 | 3 | 5 | | | |
| ROW 13 Y MOTION N2 DIGIT | 0 | 7 | 7 | 7 | 0 | | | |
| ROW 14 Y MOTION N1 DIGIT | 0 | 5 | 5 | 5 | 0 | | | |
| ROW 15 Y MOTION DIRECTION OF TRAVEL - PLUS-MINUS | PLUS | PLUS | PLUS | PLUS | MINUS | | | |
| ROW 16 Y MOTION RATE OF TRAVEL - RAPID-SLOW | RAPID | SLOW | SLOW | SLOW | RAPID | | | |
| ROW 17 Y MOTION BRAKE - ON-OFF | OFF | OFF | OFF | OFF | OFF | | | |
| ROW 18 Y MOTION AFTER Y NULL, BRAKE ON-OFF | OFF | ON | ON | ON | OFF | | | |
| ROW 19 AFTER X+Y NULL, INDEX TAPE - NOT INDEX | INDEX | NOT | NOT | NOT | NOT | | | |
| ROW 20 AFTER X+Y NULL, Z SLIDE - START DOWN-NOT | NOT | START | NOT | START | NOT | | | |
| ROW 21 SEQUENCE NO. - N2 DIGIT | 2 | 2 | 2 | 2 | 2 | | | |
| ROW 22 SEQUENCE NO. - N1 DIGIT | 0 | 1 | 2 | 3 | 4 | | | |
| ROW 23 SPINDLE - RUN-STOP | STOP | RUN | STOP | RUN | STOP | | | |
| ROW 24 END OF BLOCK | END | END | END | END | END | | | |

INVENTORS,
MORRIS R. HICKS
JOSEPH C. LE VEQUE
BY
Bosworth, Sessions,
Herrstrom & Cain
ATTORNEYS Patented Aug. 14, 1973

| TYPICAL SEQUENCE WHEN MACHINE IS USED FOR MILLING | INFORMATION BLOCK NUMBER | | | | | | | |
|---|---|---|---|---|---|---|---|---|
| | 1 | 2 | 3 | 4 | 5 | 6 | 7 | 8 |
| ROW 1 | X MOTION - N5 DIGIT | 1 | 1 | 1 | 1 | 1 | | | |
| ROW 2 | X MOTION - N4 DIGIT | 3 | 3 | 8 | 8 | 0 | | | |
| ROW 3 | X MOTION - N3 DIGIT | 0 | 0 | 0 | 0 | 0 | | | |
| ROW 4 | X MOTION - N2 DIGIT | 0 | 0 | 0 | 0 | 0 | | | |
| ROW 5 | X MOTION - N1 DIGIT | 0 | 0 | 0 | 0 | 0 | | | |
| ROW 6 | X MOTION - DIRECTION OF TRAVEL - PLUS-MINUS | PLUS | PLUS | PLUS | PLUS | MINUS | | | |
| ROW 7 | X MOTION - RATE OF TRAVEL - RAPID-SLOW | RAPID | RAPID | SLOW | SLOW | RAPID | | | |
| ROW 8 | X MOTION - BRAKE - ON-OFF | OFF | OFF | OFF | OFF | OFF | | | |
| ROW 9 | X MOTION - AFTER "X" NULL, BRAKE ON-OFF | OFF | OFF | OFF | OFF | OFF | | | |
| ROW 10 | Y MOTION - N5 DIGIT | 0 | 0 | 0 | 0 | 0 | | | |
| ROW 11 | Y MOTION - N4 DIGIT | 7 | 7 | 7 | 7 | 5 | | | |
| ROW 12 | Y MOTION - N3 DIGIT | 4 | 5 | 5 | 5 | 0 | | | |
| ROW 13 | Y MOTION - N2 DIGIT | 0 | 0 | 0 | 0 | 0 | | | |
| ROW 14 | Y MOTION - N1 DIGIT | 0 | 0 | 0 | 0 | 0 | | | |
| ROW 15 | Y MOTION - DIRECTION OF TRAVEL - PLUS-MINUS | PLUS | PLUS | PLUS | PLUS | MINUS | | | |
| ROW 16 | Y MOTION - RATE OF TRAVEL - RAPID-SLOW | RAPID | SLOW | SLOW | SLOW | RAPID | | | |
| ROW 17 | Y MOTION - BRAKE - ON-OFF | OFF | OFF | ON | ON | OFF | | | |
| ROW 18 | Y MOTION - AFTER "Y" NULL BRAKE ON-OFF | OFF | ON | OFF | OFF | OFF | | | |
| ROW 19 | AFTER X+Y NULL, INDEX TAPE - NOT INDEX | INDEX | NOT | NOT | NOT | NOT | | | |
| ROW 20 | AFTER X+Y NULL, "Z" SLIDE START DOWN - NOT | NOT | NOT | NOT | NOT | NOT | | | |
| ROW 21 | SEQUENCE NO. - N2 DIGIT | 1 | 1 | 1 | 1 | 1 | | | |
| ROW 22 | SEQUENCE NO. - N1 DIGIT | 5 | 6 | 7 | 8 | 9 | | | |
| ROW 23 | SPINDLE - RUN - STOP | STOP | STOP | RUN | STOP | STOP | | | |
| ROW 24 | END OF BLOCK | END | END | END | END | END | | | |

Fig. 24

INVENTORS.
MORRIS R. HICKS
JOSEPH C. LEVEQUE
BY
Bosworth, Sessions,
Herrstrom & Cain
ATTORNEYS.

Patented Aug. 14, 1973 3,752,036

INVENTORS.
MORRIS R. HICKS
JOSEPH C. LE VEQUE
BY Bosworth, Sessions,
Herrstrom & Cain
ATTORNEYS Patented Aug. 14, 1973

INVENTORS.
MORRIS R. HICKS
BY JOSEPH C. LE VEQUE
Bosworth, Sessions,
Herrstrom & Cain
ATTORNEYS.

INVENTORS.
MORRIS R. HICKS
JOSEPH C. LE VEQUE
BY
Bosworth, Sessions,
Herrstrand Cain
ATTORNEYS.

PROGRAMMABLE FLUIDIC LOGIC CONTROLLED MACHINE TOOL

The present invention relates in general to apparatus embodying a control system wherein information read from coded input record such as punched tape or the like is supplied to fluidic data processing circuit means that in turn controls the operations of a utilization device such as a machine tool or the like, in which a numerically defined program of successive motions to be executed along a path is represented on successive blocks of, and read from the input record into means that governs the drives for the movable elements of the machine tool.

In general, such numerical controls for machine tools embody electrical elements such as electrical switches, relays, transistorized units and the like. They are very susceptible to unstable conditions.

For example, many, if not all of the electrical numerical control systems on the market now are susceptible to malfunctioning if there should be a substantial change in the voltage or the current that is supplied to them, originating either from the power source or from internal causes in the system. In other cases, electrical switches or relays having movable parts are susceptible to malfunction if thy are exposed to dust or other contaminants.

When it is realized that machine tools employing a numerical system usually cost many thousands of dollars and are employed in machining expensive work, the malfunctions can either damage the machine or cause the work to be wrongly machined, in either case with substantial economic losses.

SUMMARY OF THE INVENTION

According to the present invention, the desired numerical control of movable parts of machine tools or the like to achieve the desired positioning and rates of movement of the parts is achieved by the use of a system in which electrical elements are largely, and if desired, completely eliminated and in which the desired positioning and movements are achieved by use of fluid logic elements arranged in unique manners in fluid logic circuit means.

More particularly, the invention provides automatic programmable apparatus for performing cutting operations on a workpiece, comprising first and second holders, of which one of the holders is a work holder and the other is a tool holder, the first of the holders being movable relatively to the second holder, program input means for providing a positioning instruction to the first holder, means associated with the first holder for providing information as to the actual position of the first holder, fluid logic circuit means for comparing the actual position of the first holder to the position instructions and providing fluidic signal outputs accordingly, and means responsive to such signal outputs for controlling the movement of the first holder in response to a mismatch between the actual position of the first holder and its instructed position. The apparatus may be made to carry out a sequence of operations that are programmed on the program input means.

According to another aspect, the program input means can be programmed to move the second holder to cause its tool to make a cut in the workpiece in response to correspondence between the actual position and the instructed position of the first holder and in response to motion instruction from the program input means.

According to a preferred embodiment, there are three holders or carriages, movable along different axes, two of which carriages are movable in at least two directions, cooperate to position the workpiece. The third carriage carries the cutting tool. Each of the two carriages that act to position the workpiece has its own position transducer, and the tool holding carriage is controlled from the program input means.

DESCRIPTION OF THE DRAWINGS

These and other objects and advantages of the invention will be apparent from the following description of a preferred embodiment of the invention in connection with the accompanying drawings in which:

FIG. 2 is a front elevation of the machine tool to the same scale as FIG. 1;

FIG. 3 is a partial plan from line 3—3 of FIG. 2 and to the same scale;

FIG. 4 is a detail of a view of a carriage position transducer from line 4—4 of FIG. 2;

FIG. 23 is an illustrative chart of the program steps that might be followed when the machine is used for drilling;

FIG. 24 is an illustrative chart of the program steps that might be followed when the machine is used for milling;

GENERAL ARRANGEMENT

For the purpose of illustration, the invention is disclosed hereinafter in connection with a vertical tool-holding spindle type of machine tool in which the work is mounted on a generally horizontal table that is movable along two generally horizontal axes, and in which there is a rotating tool such as a drill bit or a milling cutter that is movable along a generally vertical axis if desired, into contact with the work to drill a hole or mill a surface in the work at a location or in a direction as desired. The present invention will be discussed in connection with the moving and positioning of the work and the tool relative to each other and operating both according to a prerecorded coded program.

Figure 1:
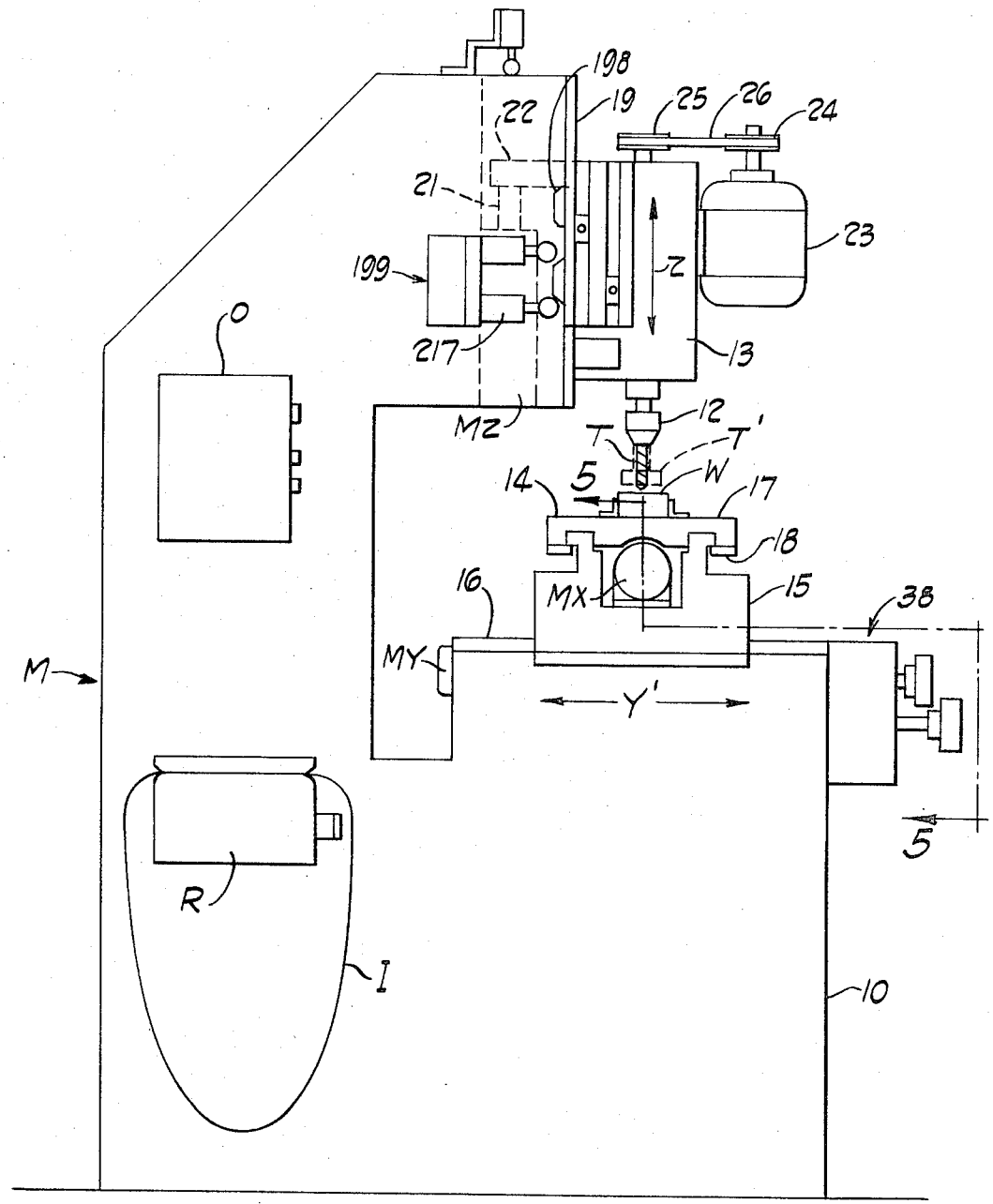
FIG. 1 is a side elevation of a machine tool embodying the invention, which may be employed as a vertical spindle drilling or milling machine.

As shown in FIGS. 1 and 2, the illustrated apparatus comprises a machine tool M connected to a decoding device such as a tape reader R that reads prerecorded program data on an input record such as a tape I having patterns of holes that contain the program record.

The illustrated vertical spindle machine tool comprises a conventional base 10. A rotatable tool holder or spindle 12, adapted to carry a tool such as a drill bit T shown in full lines, or a milling cutter T' which may be a side mill cutter shown in broken lines, is mounted on a carriage 13 that is vertically movable on the base by means to be described. A work holder 14 taking the form of a work table to which the work W may be clamped by suitable conventional means, is horizontally movable, by means to be described, parallel to two horizontal axes; one axis indicated as "X" parallel to the front face of the machine and shown by the arrows in FIG. 2; and the other axis indicated as "Y" at right angles to axis X as shown by the arrows in FIG. 1. Both of these axes are at right angles to the vertical axis "Z" along which the spindle 12 is moved (FIG. 1).

Worktable 14 is supported from base 10 and power actuated as follows: A first carriage 15, the Y carriage, is slidably mounted on the base 10 by conventional guide means 16 for movement in a fixed guided path parallel to the Y axis and is positively moved by a hydraulic motor MY mounted on base 10 and operatively connected to carriage 15 to move it as required when the motor is suitable actuated. A second carriage 17, the X carriage, the upper portion of which constitutes work table 14 in this embodiment, is slidably mounted on carriage 15 by conventional guide means 18 for movement parallel to the X axis in a fixed guided path on carriage 15. The second carriage is positively moved by hydraulic motor MX mounted on first carriage 15 and operatively connected to carriage 17 to move it as required when the motor is suitably actuated.

The carriage 13, the Z carriage, carrying spindle 12 is a third carriage and is slidably mounted on base 10 by conventional guide means 19 for movement in a fixed guided path along the vertical Z axis, and is positively moved by hydraulic cylinder MZ secured to base 10 and having a piston rod 21 fixed to arm 22 on carriage 13. Spindle 12 is rotated as required by electric motor 23 on carriage 13 through motor pulley 24, spindle pulley 25, and belt 26 engaging these pulleys.

The hydraulic motors MX, MY and hydraulic cylinder MZ are powered by hydraulic fluid under suitable pressure, as of from about 100 to about 500 pounds per square inch (psi) supplied from a suitable conventional source identified as 27 in various figures.

The workpiece W is moved by the work table 14 parallel to either or both the X or Y axis to one or more predetermined positions established by tape I and read by reader R, where the tool can be brought into contact with the work, and the tool if a drill can be rotated to drill one or more holes in the work at desired locations on the work, or the tool if a milling cutter can be rotated to cut the work for a desired depth and distance while the work is moved according to a program on the tape. According to the present invention, the workpiece may be so moved at a variable speed.

The means utilized in the illustrated apparatus are described below for translating the data on the tape into signals that control the motors MX and MY, cylinder MZ and motor 23 to accomplish this in the illustrated apparatus.

DRIVE MEANS AND POSITION TRANSDUCER FOR A CARRIAGE

Figure 5:
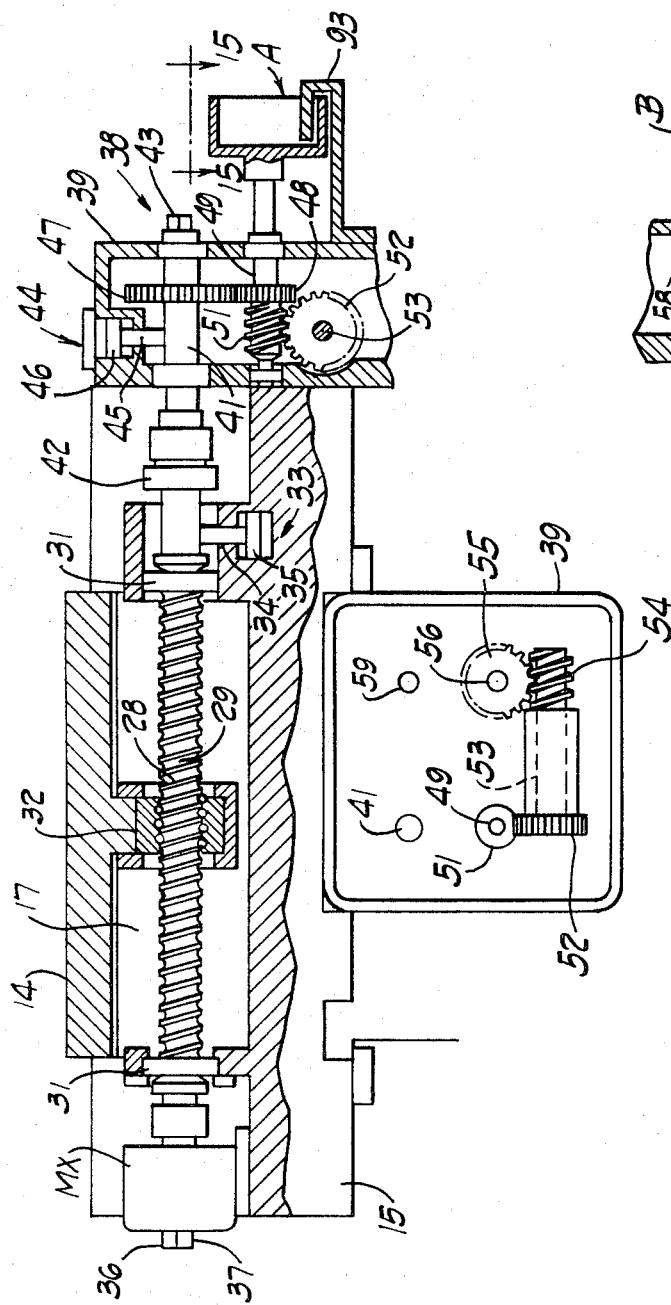
FIG. 5 is an enlarged view, partially in section, along line 5—5 of FIG. 1 of a portion of horizontally movable lower carriage and a higher horizontally movable carriage slidably mounted on the lower carriage, showing the means for guiding the upper carriage and showing portions of each of the carriage position transducers.
Figure 6:
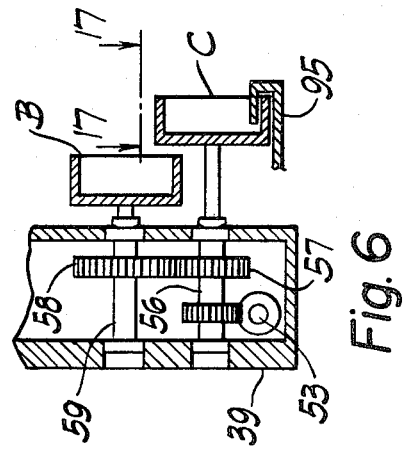
FIG. 6 is a detail, along line 6—6 of FIG. 4, of a portion of one of the carriage position transducers.

FIGS. 4-6 illustrate the means shown for driving, from motor MX, the carriage 17 parallel to the X axis on carriage 15, and for driving a series of rotatable carriage position transducer drums A, B and C used in comparing the position of carriage 17 with the data on the tape I.

Motor MX, a reversible hydraulic motor of conventional type, is mounted on carriage 15, and is adapted to rotate a screw member 28, having a helical thread 29 that is rotatably mounted by bearings 31 on carriage 15. Carriage 17 has secured to it a nut member 32 that engages the thread 29 so that rotation of screw member 28 in either direction will cause carriage 17 to move in its guided path on carriage 15 parallel to the X axis, in a direction depending on the direction of rotation of member 28. Carriage 15 also carries a fluid-actuated brake 33 comprising a braking member 34 adapted to contact member 28 and to be actuated by fluid-actuated piston 35; under normal circumstances there is no force applied to the piston to produce braking action.

The free end of shaft 36 of motor MX has flat surfaces 37 to permit engagement and turning of the shaft by a removable crank or wrench.

Carriage 15 also carries a carriage position transducer 38 that compares the position of the carriage 17 along the X axis with signals from the tape I giving information as to the desired position of carriage 17. Transducer 38 is actuatable by screw member 28. It comprises a bracket 39 fixed to carriage 15, which bracket rotatably supports a first shaft 41 coaxial with member 28 and adapted to be coupled to and disconnected from member 28 by a conventional fluid actuated clutch 42. The uncoupled end of shaft 41 has flat surfaces 43 to permit engagement and rotation of the shaft by a disconnectible crank or wrench.

Shaft 41 is adapted to be braked and halted as required by a brake 44 comprising a braking member 45 adapted to engage the shaft and be actuated by a fluid actuated piston 46.

A gear 47 fixed to shaft 41 drives a pinion 48 rigidly mounted on a second parallel shaft 49 journaled in bracket 39. An open-ended cylindrical transducer drum A is mounted on a projecting end of shaft 49 to rotate with it. Shaft 49 also rigidly carries a worm 51 that engages a worm wheel 52 mounted on a cross shaft 53 journaled in bracket 39 (FIGS. 5 and 6). Shaft 53 also rigidly carries a worm 54 that drives another worm wheel 55 on a shaft 56 parallel to shafts 41 and 49 and journaled in bracket 39 (FIG. 6). Shaft 56 rigidly carries a second cylindrical open-ended transducer drum B. Shaft 56 also carries a pinion 57 that drives a gear 58 mounted on a shaft 59 that carries a third cylindrical open-ended transducer drum C.

It is apparent that rotation of screw member 28 by motor MX or by wrench or crank power applied to shaft 36 will cause carriage 17 to move parallel to the X axis on carriage 15, and will also cause rotation at different rates of the three drums A, B, and C. In the illustrative example provided by this disclosure, the threads on the screw member 28 and the gearing driving the drums are such that one inch of travel of carriage 17 on carriage 15 results in 10 revolutions of drum A, in one-tenth of a revolution of drum B, and in one-thirtieth of a revolution of drum C.

An identical arrangement is employed to move carriage 15 from motor MY on the frame 1 in a fixed path parallel to the Y axis. A transducer 38 is associated with carriage 15 to compare its position on base 10 along the Y axis with signals from the tape I giving information as to the desired position of carriage 15; this transducer is identical with that described as associated with carriage 17, and its illustrated parts have reference characters identical to those of corresponding parts of the transducer associated with carriage 17. It is therefore not necessary to describe the arrangement and transducer for carriage 15.

The three drums on each transducer 38 are perforated as will be described later for the purpose indicated later.

TAPE AND TAPE READER

Figure 7:
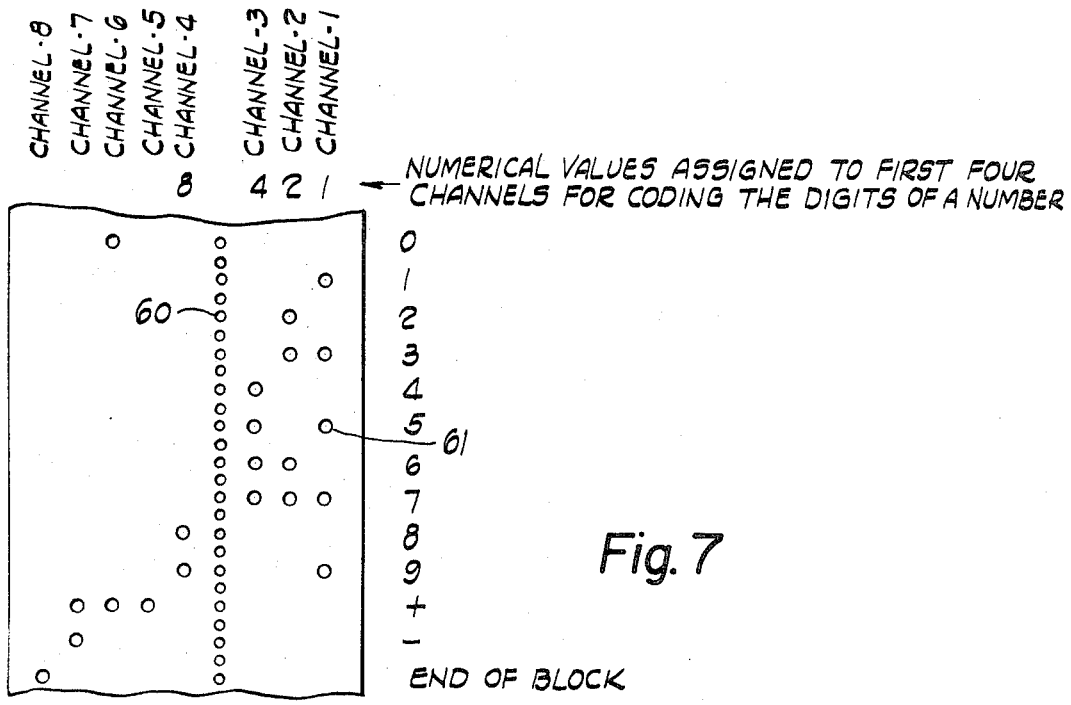
FIG. 7 is a fragment to an enlarged scale of a piece of control tape showing the numerical coding system used on the tape.

The punched tape I (FIGS. 1, 7) is illustrative of a variety of input records, such as tapes or cards, containing prerecorded program information that can be utilized in the illustrated apparatus and system. The illustrative tape is a known one-inch wide eight-track tape, formed of a strip of paper or other sheet material, that is widely used in the numerical control of machine tools and for other purposes, and is coded in a coding identified as Electronics Industries Association (EIA) coding. FIG. 7 shows a piece of such tape. The tape has a continuous line of perforated holes 60 that allow it to be driven by the sprocket of a tape drive system; it also discloses the EIA arrangement of holes 61 used for coding digits 0 through 9 and the signs plus (+) and minus (−), and "end of block." The first four channels are assigned numerical values of 1, 2, 4 and 8, and the digits 1 through 9 are made up of combinations of one or more of these numbers in a conventional Binary Coded Decimal or BCD code. Each of the numerical values making up the BCD digits will be referred to as a value. In the EIA system, the coding pattern for digits 1 – 9 may include holes in other channels in addition to those shown in the first four channels for parity checking purposes; however, in the interests of simplification they are not shown since they are not used in the illustrated apparatus. As indicated, certain holes in channels 5 to 8 inclusive are also used to designate plus, minus, and end of block symbols. Blocks of information controlling machine functions to be performed or functions to be indicated are coded and arranged in a predetermined pattern and recorded by punching suitable holes in the tape.

Figure 8:
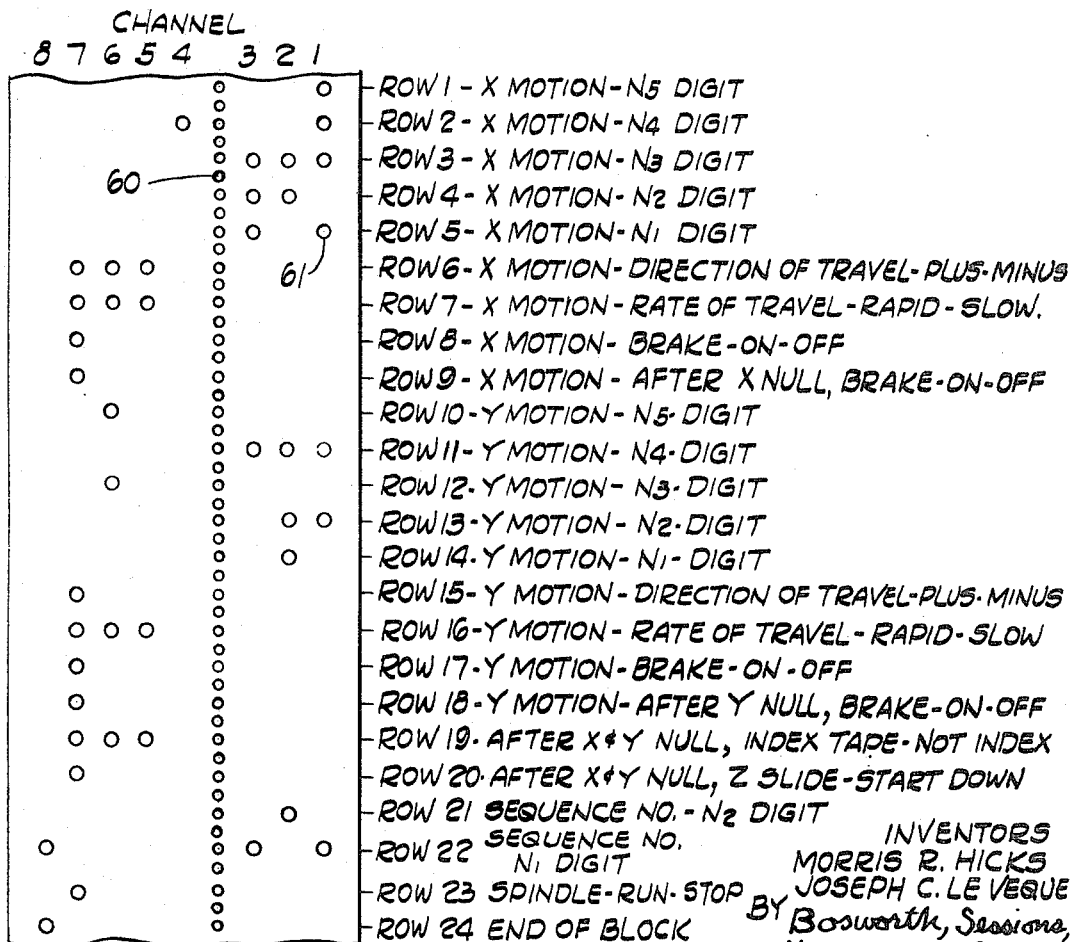
FIG. 8 is a fragment of another piece of control tape showing an illustrative arrangement or format used for the coding of a block of information.

FIG. 8 shows a segment of tape illustrating the position of holes on the tape used in an illustrative block of information showing the format of the information arrangement used with the disclosed apparatus and control system. The program of instructions to the present apparatus consists of a sequential series of blocks like that shown in FIG. 8. Each block consists of 24 rows of information.

The machine carriage position control system is predicated on the use of two five-digit numbers which may be designated as "X-$N_5N_4N_3N_2N_1$" and "Y-$N_5N_4N_3N_2N_1$" coded in rows 1–5 and 10–14, respectively, of the tape. The numbers designate a position to be assumed by carriage 17 along the X axis and by carriage 15 along the Y axis, respectively. The five-digit numbers in rows 1–5 and 10–14 will be referred to below as the X-word and the Y-word, respectively, or as the X instruction and Y instruction. The carriages may move in either a plus or a minus direction where plus is arbitrarily established as one direction of movement and minus is the other direction of movement.

Rows 6, 7, 8, 9, 15, 16, 17, 18, 19, 20, 23 each control two choices. The first choice is coded as plus (+); the other choice is coded as minus (−). Thus, the holes in row 6 of the block may be coded to designate the plus or minus direction of movement to be used for carriage 17 parallel to the X axis, and row 15 may be coded with holes indicating either the plus or minus direction of movement of carriage 15 parallel to the Y axis, and so on for all the other two-choice rows mentioned above.

Rows 21 and 22 in each block are used for coding digits $N_2$ and $N_1$ of a two digit number representing the block number or sequence number of the operation to be performed; for convenience in programming, each block of information is assigned with a sequence number representing that block of information; the information in these rows may be used to provide a visual readout of the sequence of numbers as described later.

Row 23 is coded to command the spindle 2 to rotate or be stopped during the time the machine is under the influence of that particular block of information. Row 20 is coded to command the vertically movable spindle carriage 13 to start a cycle of powered movement in a downward direction.

Row 24 is coded to signify to the tape reader that a block of coded information is in position in the reader and may now be read.

Row 7 designates the rate of travel, either rapid or slow, for carriage 17 that moves parallel to the X-axis. Row 16 does likewise for carriage 15 that moves parallel to the Y axis. Rows 8 and 9 are coded to provide desired action of brake 33 to prevent movement of the carriage 17; row 8 provides for braking of the carriage all the time a block of information is in effect; row 9 provides for braking action after the carriage 17 has moved to a position of correspondence between the commanded and the actual position. Rows 17 and 18 are likewise coded to provide desired braking action of carriage 15 by control of its brake 33.

After both carriages 15 and 17 reach a null condition between commanded and actual positions, information coded in row 19 determines whether the tape is immediately indexed to the next block of information. If tape index does not occur at this time, then the action is initiated by a machine movement or the action is manual.

In the illustratively coded segment of tape of FIG. 8, the X command position for carriage 17, rows 1-5, is 19.765, direction and rate of travel (rows 6 and 7) are "plus" and "rapid" and the brake operation, coded in rows 8 and 9, is "off" and "off." The Y command position for carriage 15, rows 10 thru 14 is 07.32. Direction and rate of travel (rows 15 and 16) are "minus" and "rapid;" and brake operation coded in rows 17 and 18, is "off" and "off." Row 19 commands the tape to index to the next block upon reaching an X and Y "null." Row 20 tells the Z slide not to move down upon reaching an X and Y "null." Rows 21 and 22 show the sequence number to be 25. During the influence of this block of tape, row 23 indicates the spindle is not to run.

SCHEMATIC REPRESENTATION OF CONTROL SYSTEM

Figure 9:
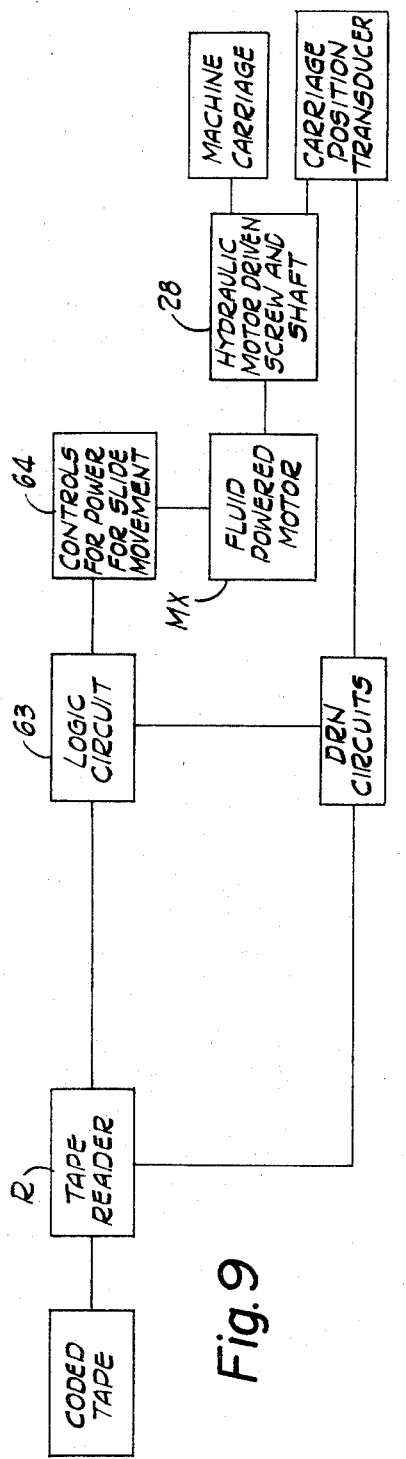
FIG. 9 is a schematic block diagram illustrating the control system as applied to one of the horizontally movable carriages of the illustrated apparatus.

FIG. 9 illustrates in a block diagram the system for powering th movement of, and controlling the positioning of each of the horizontally movable carriages 15 and 17 of the illustrated apparatus from the information on the tape I. This system embodies the elements that operate from rows 1, 2, 3, 4, 5, 6, 7, 8, 9 of a block of the tape to control carriage 17. An identical system utilizes information on rows 10, 11, 12, 13, 14, 15, 16, 17 and 18 on the block of the tape to control carriage 15.

Figure 10:
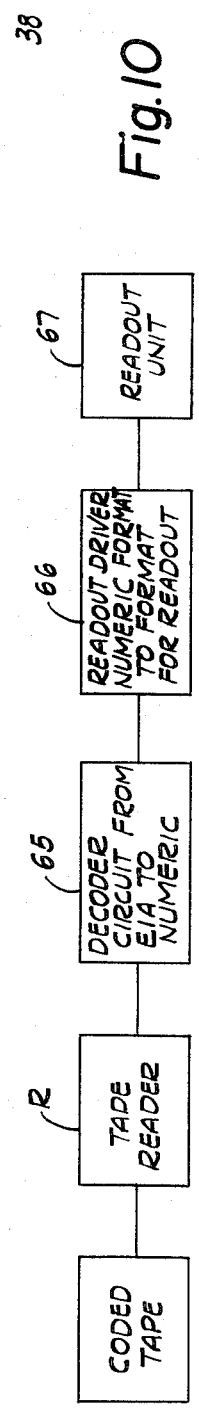
FIG. 10 is a block diagram indicating the system for reading out the block number or sequence number of the operation.

FIG. 10 illustrates in a block diagram the system that is controlled by rows 21 and 22 of the block of the tape illustrated in FIG. 8 to provide a visual indication of the block sequence number of the operation.

Figure 11:
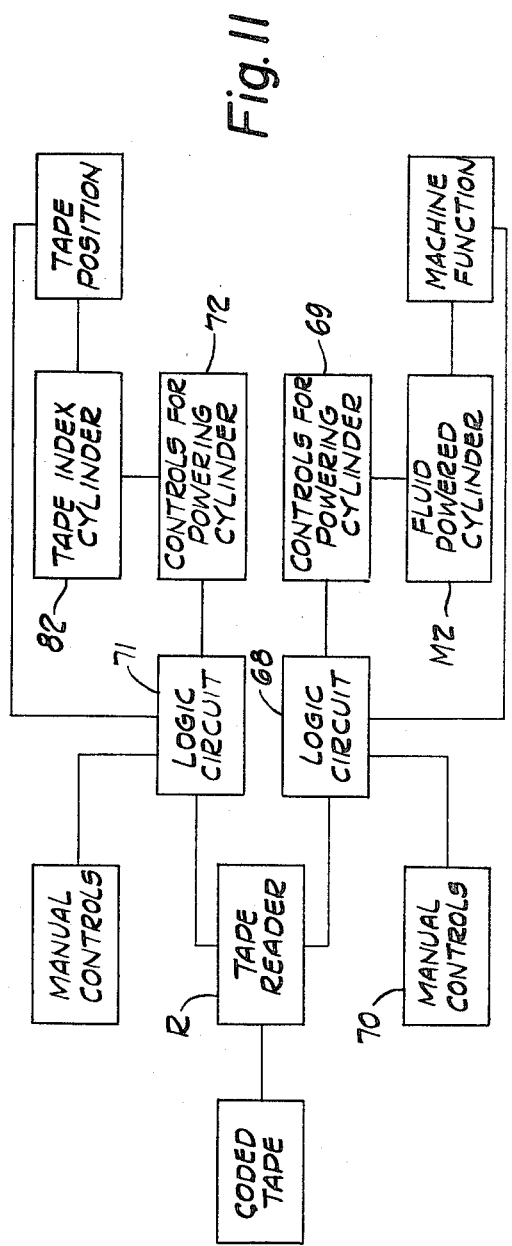
FIG. 11 is a block diagram illustrating the control system for the vertically movable carriage that carries the tool carrying spindle and for the tape indexing mechanism.

FIG. 11 illustrates in a block diagram the system controlled by row 19 of the tape for indexing the tape, and the system controlled by row 20 of the tape to control powered movement of the spindle carriage 13.

Referring to FIG. 9 as applicable to carriage 17, low pressure fluidic signals from coded information on the appropriate rows 1-9 of the tape I pass through a tape reader R and then to "digit read and null circuits" (DRN) 62 to be described later. Information passes from the reader R and the DRN circuits to a logic circuit 63 that governs operation of the controls 64 for the fluid power motor MX that drives the screw member 28 described above that positions machine carriage 17. Information from the carriage position transducer 38 also is fed into the circuits 62 as described later.

According to FIG. 10, the low pressure fluidic signals from coded information of rows 21 and 22 of the tape I passes through the reader R and thence to a decoder circuit 65 that translates the tape signals to numeric signals that are transmitted to a readout driver circuit 66 and thence to the readout unit 67.

According to FIG. 11, the low pressure fludic signals from coded information in line 20 of the tape pass through reader R, connected to a fluid logic circuit 68 that governs operations of controls 69 for cylinder MZ that moves carriage 13 along the Z axis. Information as to the status of carriage 13 passes back to the logic circuit 68. As indicated in FIG. 11, manual controls 70 are also provided to operate through the logic circuit 69 to control movement of the carriage 13.

FIG. 11 also illustrates that low pressure fluidic signals from coded information in line 19 of the tape pass through reader R which is connected to a fluid logic circuit 71 that governs operation of controls 72 in cylinder 82 that actuates the tape indexing mechanism, information that the tape is fully indexed passes back to the logic circuit. Manual controls may also be used to initiate tape index.

Circuits for implementing the instructions in the remaining rows of the tape are more conveniently disclosed in line diagrams below.

In the illustrated embodiment, the fluidic signals preferably are pneumatic signals, such as air signals, at suitable low pressures, as between about one-half to about 5 pounds per square inch, and preferably between about one and about two pounds per square inch (psi).

TAPE READER

The illustrated tape reader R (FIGS. 1, 12, 13, 14) comprises a stationary body 73 in which is journaled transversely shaft 74 that rigidly carries a gear 75. A sprocket 76, having peripheral radially extending equally spaced pins 77 adapted to engage driving holes 61 in the tape, is connected to shaft 74 through a conventional overrunning clutch 78 that engages and drives the sprocket from the shaft only when the shaft is rotated in one direction and disengages the sprocket when the shaft turns in the opposite direction. Spring-forced detents 79 in body 73 engaging radially and angularly spaced depressions 80 in the sprocket, are so arranged that they hold the sprocket against rotation when it is disengaged from the clutch.

A rack 81, slidably mounted on body 73 of the tape reader R, has teeth engaging those of gear 75. The rack is moved as required to turn gear 75 and shaft 74 in either direction by a double-acting fluid operated cylinder 82, the piston rod 83 of which is connected to the rack. A limit valve 84 is contacted by rack 81 at the end of its outward movement.

The tape I passes between reader body 73 and a cover 85 hinged on the body so the cover can be lifted to permit ready threading of the tape through the reader. The tape is moved through the reader by engagement of sprocket pins 77 in holes 61 of the tape when the sprocket is periodically turned in one direction. Body 73 has a chamber 86 supplied by air at a controlled pressure from a suitable source that includes conduit 87. From this chamber passages 88 extend upwardly to the surface of the body over which the tape passes, the holes being arranged in a number of rows extending transversely and at right angles to the path of travel of the tape; and equal to the number of rows in a block of information on the tape, the passages in each row being equal in number and spaced to align with any holes in the eight channels of the tape.

The hinged cover 85 has corresponding passages 89 communicating with the surface over which the tape passes and also communicating with separate air conduits 90.

Figure 12:
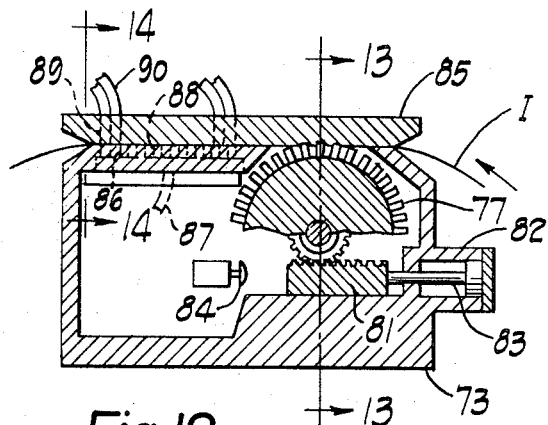
FIG. 12 is a sectional elevation along line 12—12 of FIG. 13 and to an enlarged scale, of the tape reader.
Figure 13:
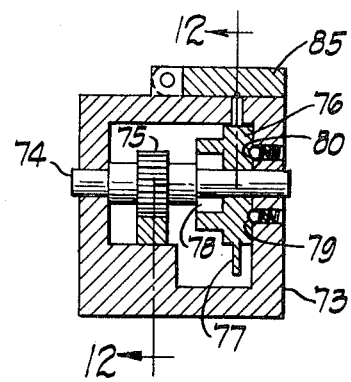
FIG. 13 is a section along line 13—13 of FIG. 12.
Figure 14:
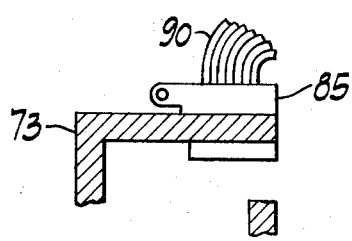
FIG. 14 is a detail along line 14—14 of FIG. 12.

The parts are so arranged that the reciprocating motion of rack 81 will cause the tape to be moved forward in the direction indicated by the arrow in FIG. 12 by predetermined incremental steps, in which at the end of each step the holes in the rows of a block of tape are aligned with coresponding rows of holes in the tape reader, so that those holes in the tape that provide signals will permit air to pass through the tape reader and out through the corresponding conduits 90.

CARRIAGE POSITION TRANSDUCER READING MEANS

Figure 15:
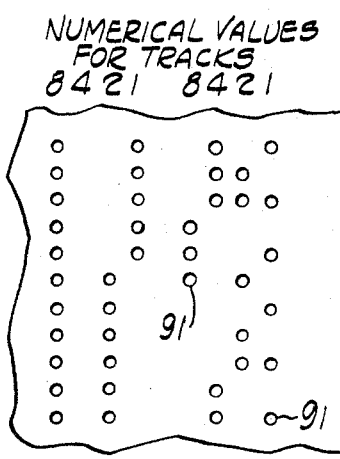
FIG. 15 is a portion of the cylindrical surface of the transducer drums indicated in FIG. 2 as A, showing a portion of the hole pattern in the drum.
Figure 16:
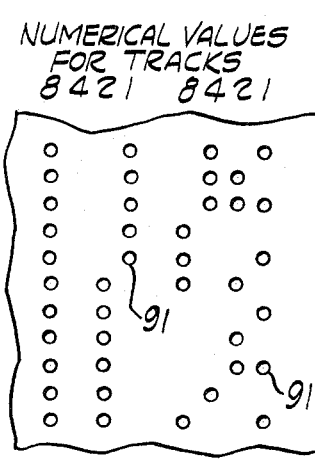
FIG. 16 is a similar view of a portion of the surface of the transducer drum indicated in FIG. 2 as B, showing a portion of the hole pattern in the drum.
Figure 17:
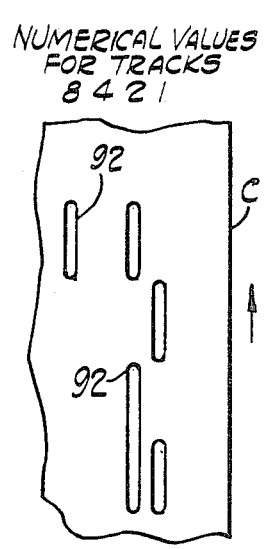
FIG. 17 is a view of the portion of the surface of the third drum indicated in FIG. 2 as C, showing an elongated hole pattern in the drum.

FIGS. 15, 16 and 17 respectively show developed partial views of the cylindrical surfaces of drums A, B and C of the carriage 15 and 17. In each surface of each drum there are openings arranged in a predetermine pattern and extending through the cylindrical drum flange to its outer cylinder surface.

Thus, in each of drums A and B (FIGS. 15, 16) there are 100 axially extending rows of generally circular holes 91 equally spaced circumferentially around the drum and there are eight circumferential tracks or channels for the holes in each row. Drum C (FIG. 17) has elongated slots 92 arranged circumferentially in three tracks corresponding to three of the first four tracks, counting from the right, of the drums A and B (FIGS. 15, 16). In the drums A, B and C for carriage 17, sets of tracks are used for digits in the X-word; in the drums for carriage 15, sets of tracks are used for digits in the Y-word.

The EIA coding system mentioned above uses a significant pattern of hole arrangements in four of the available eight tracks to codify the values 0 through 9. Each of the drums A and B, however, with two sets of four tracks for each axial row of holes, has capability of coding two digits. Drum C has a capability of coding one digit. The value 0 is coded as a hole in each of the second and fourth tracks. Therefore, one variation of the EIA coding system is here employed.

FIG. 15 illustrates the hole pattern in a segment of drum A. From top to bottom of the figure, the digits represented by the hole pattern are 95, 96, 97, 98, 99, 00, 01, 02, 03, 04, 05; therefore, with 100 rows in one revolution of the drum, all numbers from 00 through 99 can be represented. The same applies to drum B, FIG. 16. In drum C. FIG. 17, the digits 0, 1, 2, 3 are represented by coded elongated holes or slots 92.

In the illustrated embodiment, taking into account that 1 inch of travel of carriage 17 results in 10 revolutions of drum A, one-tenth revolution of drum B, and one-thirtieth revolution of drum C, drums A, B and C for each arriage 15 or 17 can represent values from 00.000 to 39.999 inches to indicate the carriage position with respect to an imaginary reference line.

The previously indicated X-word and Y-word are five-digit numbers expressing the desired positions of carriage 17 (the X carriage) and carriage 15 (the Y carriage) as recorded within a block of information on the tape. The five digit number represented by a single row of holes from the drums A, B and C of the transducer for one of these carriages represents the actual position of the carriage with reference to the imaginary reference line.

Drums A, B and C respectively have associated reader members 93, 94 and 95.

Figure 18:
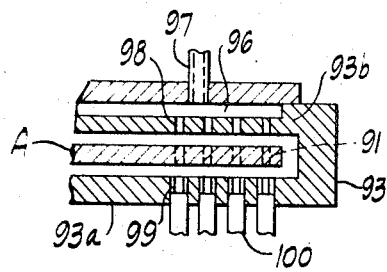
FIG. 18 is a sectional elevation to an enlarged scale of a portion of a drum and its associated drum reader, along line 18—18 of FIG. 4.

FIG. 18 shows in cross section the cylindrical flange of drum A and its relation to its reader member 93 and one axially extending row of holes 91 in the drum flange.

Reader member 93 is a U-shaped member having a portion 93a extending outside the drum flange and a portion extending inside the drum flange, these portions being sufficiently close to the drum flange to prevent substantial leakage or short circuiting of air, although it is not necessary to have air-tight seals at these locations since all that is required as outputs from the reader are air signals.

Portion 93b has a chamber 96 to which air is supplied from a source including conduit 97 at a pressure preferably corresponding to that of the air supplied to the tape reader. Portion 93b has a single transverse row of holes 98 communicating with chamber 96; these holes are equal in number to the number of tracks, eight in this case, on the drum, and are aligned with an axial row of holes on the drum. A single row of holes 99 extend through the other portion 93a in alignment with holes 98, and these holes communicate with conduits 100.

As the drum rotates, it brings the holes in a row in the drum flange into alignment with the holes in the reader portion of the drum, and pneumatic signals are sent out through conduits 100 in accordance with holes in the drum designating digits.

The readers for drums A and B are identical.

The same general arrangement of reader member and drum flange applies to drum C, reader member 95 differing only in the number of holes to correspond to the number and locations of the slots 92 of the drum C.

FLUID LOGIC SYMBOLOGY

For clarity, the symbols for fluid-actuated fluid logic elements used in the below described fluid logic circuits are set forth in FIGS. 19a–19h inclusive. Symbols 19a, 19b, 19c, and 19d, respectively show fluid logic elements each being connected to a conduit providing an input power stream and indicated by a line 101 with an arrow pointing toward the element, a single output signal conduit and, opposite this conduit, one or more input signal conduits. The power stream conduits are connected to a suitable source of clean fluid, such as air, under the pressure indicated above; the source, being conventional, is not shown. FIGS. 19a, 19b, 19c, 19d respectively show one, two, three and four input signal conduits. Each of these elements sometimes called a fluid amplifier, is of a known commercial type which, when the input power stream is operating, provides an output signal only when there is no input signal; in other words, an input signal in any input signal conduit of one of these elements will prevent any output signal.

Figure 19A:
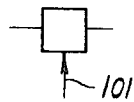
FIGS. 19a–19h illustrate the symbols used in the following fluid logic circuits.
Figure 19B:
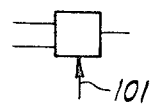
Figure 19C:
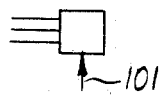
Figure 19D:
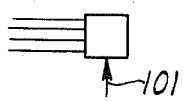
Figure 19E:
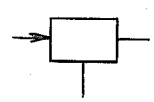

FIG. 19e illustrates a known fluid logic element providing a fluidic-to-pneumatic interface element wherein a fluidic low pressure signal entering from the bottom controls higher pressure fluid in a power jet entering from the left to cause a higher pressure fluid signal leaving the element at the right in FIG. 19e.

Figure 19F:
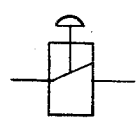

FIG. 19f designates a commercially available limit valve wherein manual operation of the handle at the top opens or closes an internal passage for transmission of or closing off of a fluidic signal.

Figure 19G:
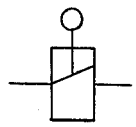

FIG. 19g discloses a commercially available mechanically operated limit valve that operates similarly.

Figure 19H:
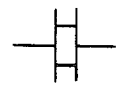

FIG. 19h designates a portion of the tape or of the drum and its reader that by means of the coded holes described above presents signals to the machine logic circuit.

DIGIT READ AND NULL CIRCUIT (DRN)

As indicated above, the drums A, B, C rotate in exact relationship to each other and to the linear motion of the carriage with which they are associated. Subcircuits designated "Digit Read and Null Circuits" (DRN) compare the signals from the hole patterns in the tape and drum, and, when the signals match, issue signals to following logic circuits that initiate and maintain motion of the carriage with which the drums are associated.

Figure 20:
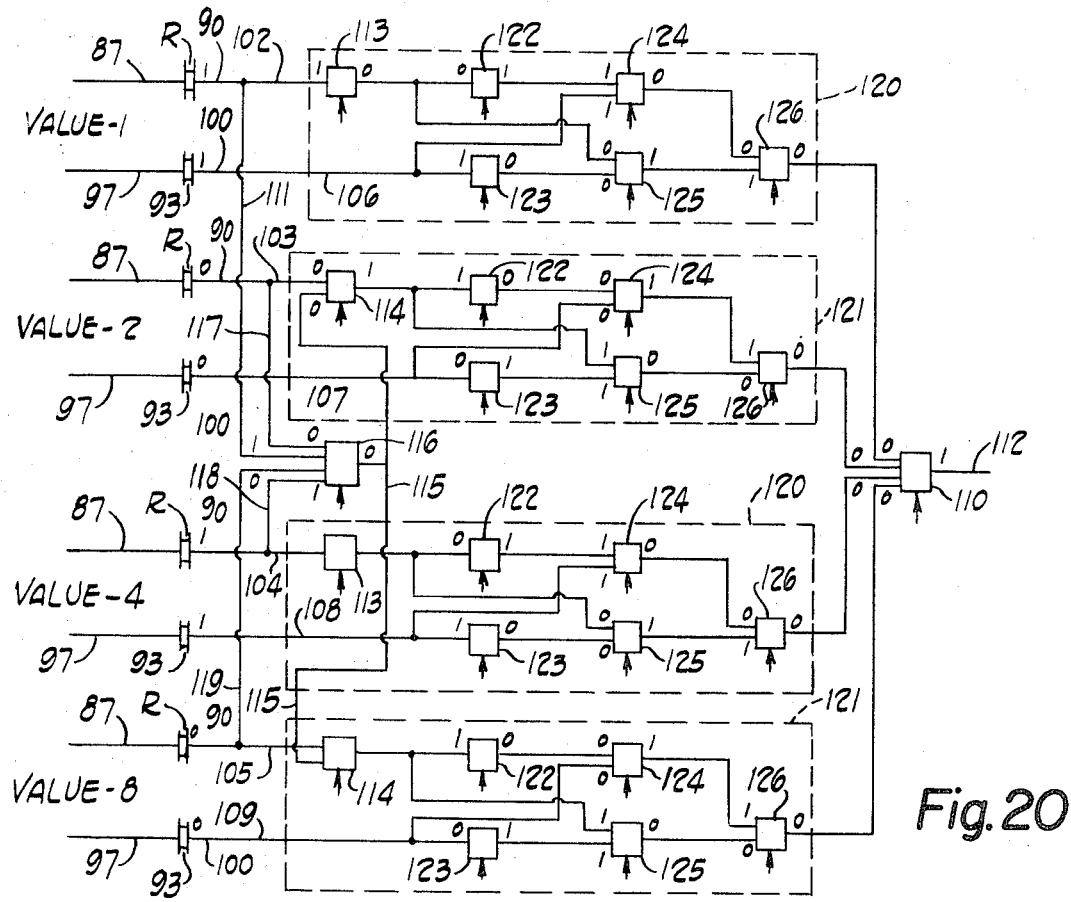
FIG. 20 is a schematic diagram of one of the digit read and null fluid logic subcircuits used in a fluid logic circuit for controlling the position of one of the horizontally movable carriages of the illustrated apparatus.

The DRN circuits for digits $N_4$, $N_3$, $N_2$, $N_1$ for each carriage 15 and 17 are identical; one is shown in FIG. 20.

Figure 21:
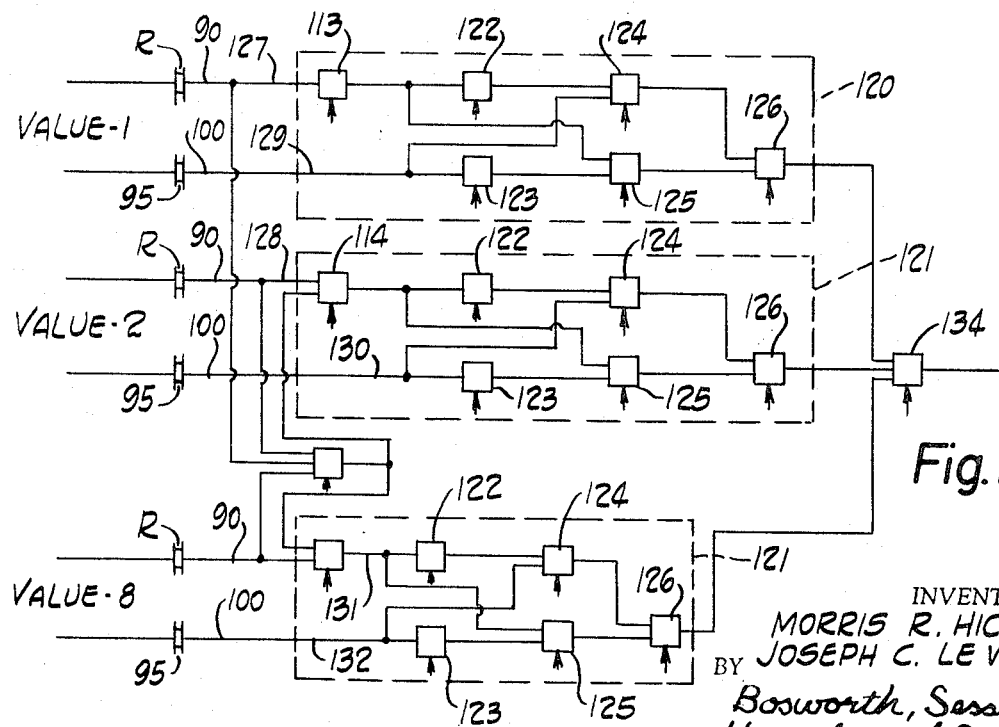
FIG. 21 is a diagram of another digit read and null circuit used in conjunction with several of the circuits of FIG. 20 in a fluid logic circuit for controlling the position of one of the carriages.

The digit read and null circuit for digit $N_5$ is shown in FIG. 21; this circuit is simpler than, although similar to, that shown in FIG. 20 since the digit $N_5$ has a maximum value of 3 whereas each of the other digits handled by the circuits typified by FIG. 20 have a maximum value of 9. DRN circuits like that of FIG. 21 are used for digit $N_5$ of each carriage 15 and 17.

An individual subcircuit identical with that of FIG. 20 is therefore employed in the control system of the illustrated apparatus in connection with each of rows 2, 3, 4 and 5 and each of rows 11, 12, 13 and 14, of each block of tape (FIG. 8).

The circuit of FIG. 20 which relates to one of these rows, includes lines 102, 103, 104 and 105 connected to the appropriate output conduits 90 of the tape reader (FIGS. 12, 14) for such row. The circuit also includes lines 106, 107, 108 and 109 connected to the appropriate output conduits 100 (FIG. 18) of the reader member for one of the drums A or B of the carriage position transducer 38 associated with the carriage which is to be controlled by the particular row of holes in the tape. As shown, lines 102 and 106, 103 and 107, 104 and 108, and 105 and 109 form pairs. The first pair relate to the holes in the drum and tape having a value of 1 the second pair relate to the holes in drum and tape having a value of 2; the third pair relate to the holes having a value of 4; and the fourth pair relate to the holes having a value of 8, which is indicated in FIG. 20 by the legends value-1, value-2, value-4 and value-8.

The circuit of FIG. 20 with one exception to be discussed later, performs a value-to-value comparison of the values making up one digit, for example, $N_2$ of the five-digit X word or Y word on tape, to the corresponding values making up the corresponding digit on the drum A or B. Other circuits identical to that in FIG. 20 compare the values of the other digits of the X word and Y word on tape to the corresponding values of the corresponding digits of the respective words on the drums.

The circuit of FIG. 20 operates so that air at the above indicated low pressure supplied to supply conduit 87 (FIG. 12) to the tape reader R will or will not provide signals in output lines 102, 103, 104 and 105 depending on the pattern of holes in the tape. Simiarly, air at such pressure supplied to the drum readers, for example member 93 of drum A, through conduit 97, to the pattern of holes in the drum will or will not produce signals in lines 106, 107, 108 or 109. When the tape is read and the resulting pneumatic signals produced by the tape reader are not matched by the signals produced by the drum reader, an output fluid logic element 110, which acts as an "and" gate does not transmit a signal to line 112 that proceeds to the subsequent part of the circuit. When the signals from the tape reader and drum reader do match the element 110 does transmit a signal to line 112.

In the output portion of each line 102 and 104, there is a fluid logic element 113 that acts as an inverter. Elements 114 corresponding positions in lines 103 and 105 each have an additional signal input line 115 that is connected to the output of the "and" gate element 116 having four input conduits 111, 117, 118, 119 respectively connected to lines 102, 103, 104 and 105.

Each element 113 or 114 and associated logic elements 122, 123, 124, 125 and 126, of the type described above in FIGS. 19a and 19b, form an EXCLUSIVE OR gate designated 120 or 121.

Each EXCLUSIVE OR gate operates so that no signal output is produced from its element 126 if two signals are present at the input of such EXCLUSIVE OR gate or if no signals are present at the input of the gate. If only one signal is present at the input of such gate, an output signal will be produced by element 126. Thus, no signal will be produced at the output of element 126 if, and only if, the output from the tape is the same as the output from the drum, both outputs being either a signal or no signal. When the output from each element 126 is no signal, element 110 produces a signal to line 112 indicating that the information from the tape matches that from the drum.

The operation of this circuit can be understood assuming that it is used to read a digit in row 5 of a tape block (FIG. 8) and that the tape is calling for the digit "5." If the drum A associated with the carriage to be controlled matches the digit "5," then the conditions are as shown in FIG. 20 in which the symbol 1 designates the presence of a signal and 0 indicates lack of a signal. It is apparent that when the outputs of the tape and drum reader match as is shown by the signals 1 in the pairs for values 1 and 4 and by the 0 indicating no signals in the pairs for values 2 and 8 then there is no signal into element 110 but there is an output signal from that element. Thus, a signal is given by the DRN circuit in this case when both the tape and the drum read a "5."

A special situation arises when a digit "0" from the tape must be compared to a digit "0" from the drum.

In the EIA code pattern used on the tape, the code for digit "0" is no holes in channels 1, 2, 3, 4. Consequently, since information regarding numeric values is contained in channels 1, 2, 3, 4 of the tape, in effect the hole pattern for the value "0" is no holes in the tape. The tape hole pattern is not read by the tape reader R as the tape moves over the reading holes in the tape reader, but is read only after the tape has moved for the distance of a block and the tape has stopped in the proper position with the holes in the various rows of the tape aligned with the holes in corresponding rows of the tape reader.

Each drum, however, is read by its reader continuously as it revolves. There is therefore a condition when the space between two rows of holes is being read and would be interpreted under the EIA code as "0." To prevent this situation from arising, the code for "0" on the drum is made to be a hole in each of channels 2 and 4 corresponding to value positions 2 and 8 which are not normally used simultaneously in the EIA numeric code.

It is necessary in the circuit of FIG. 20 to indicate a match by providing an output signal from element 110 when a tape "0" corresponds with a drum "0." To accomplish this the tape "0" is detected by element 116 and converted to a drum "0" which may then be matched with drum "0" to produce a signal from element 110. Tape "0" is detected by logic element 116 which produces an output signal only if tape "0" is detected. The signal from element 116 is sent to elements 114 in the EXCLUSIVE OR circuit to, in effect, convert the no signal inputs from channels 2 to 4 on the tape to signal inputs to match those from the drum. Except for this correction for the "0" digit the operation of the DRN in FIG. 20 is as described above.

The circuit for detecting correspondence between the highest order digits from the tape and from the drum is considerably simpler and shown in FIG. 21. This circuit does not have the parts representing value 4 but is otherwise the same as that of FIG. 20; it can accommodate values 0, 1, 2 and 3. In this case the circuit comprises three pairs of outlet signal conduits from the tape reader R and reader 95 for drum C, pair 127 and 129 representing hole positions that have a value of 1, pair 128 and 130 representing hole positions having a value of 2, and a pair 131 and 132 representing hole positions having a value of 8. Lines 127 and 129, are connected to an EXCLUSIVE OR gate 120 like that of FIG. 20, and lines 128 and 130 and lines 131 and 132 are connected to an EXCLUSIVE OR gate circuit 121 identical with that of FIG. 20. The terminal element 126 of these gate circuits has its output signal conduits connected to fluid logic element 134 which is also an AND gate element that will produce a signal only when all input signal lines have no signal. By analogy to the operation of the circuit of FIG. 20, it is apparent that this circuit of FIG. 21 will emanate a signal only when both the tape and the drum have output signals indicating that the digits "0," "1," "2" or "3" are present on both the tape and the drum.

Therefore, in each DRN circuit, when the digit read from the drum reader is not the same as that read from the tape reader, no signal is produced by element 110 or 134 as the case may be; however, when the digits from the two readers are the same then the input from elements 110 and 134 is a signal that is utilized as described below.

LOGIC CIRCUITS UTILIZING DRN CIRCUIT OUTPUTS FOR CONTROLLING CARRIAGES

Figure 22:
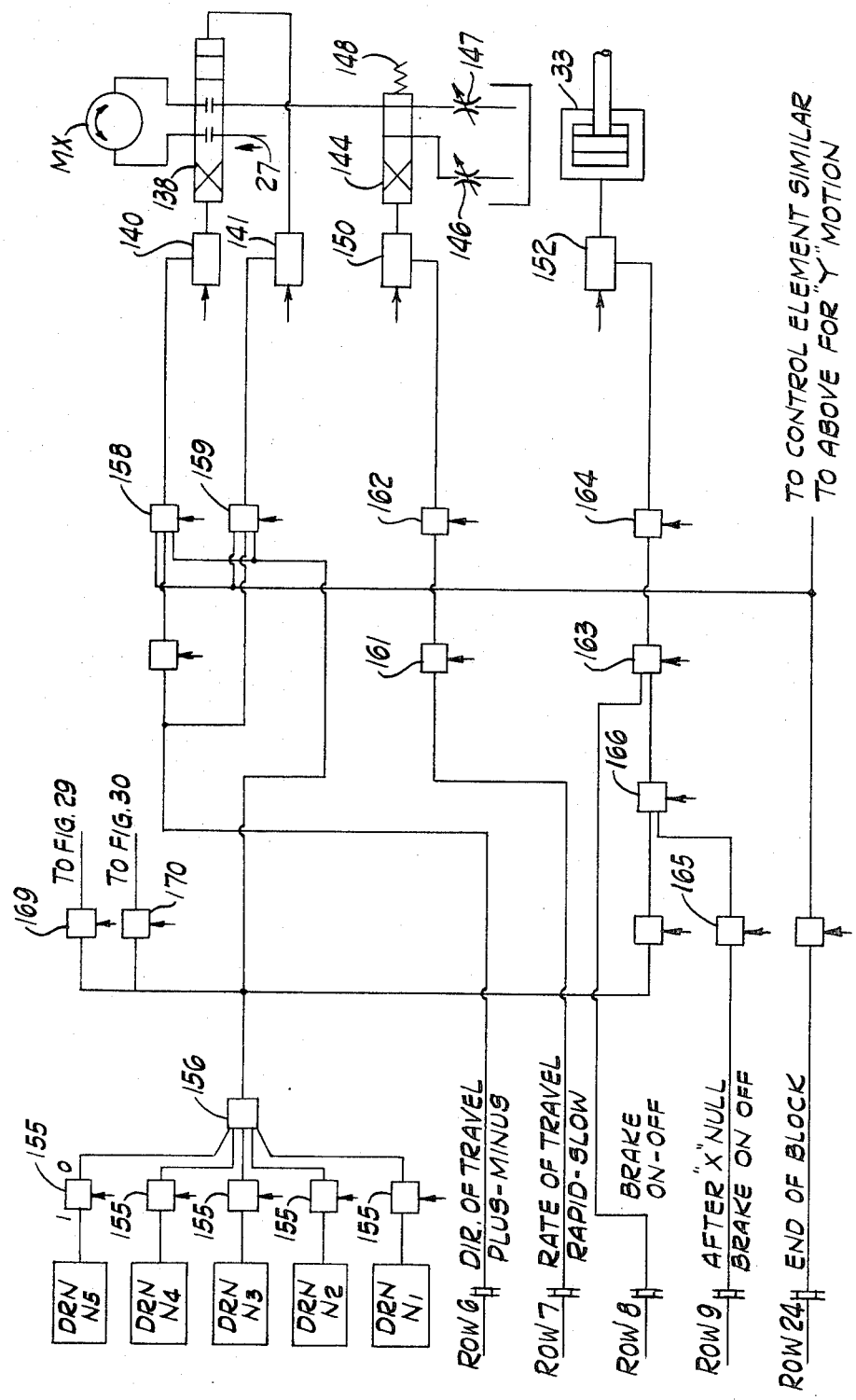
FIG. 22 is a diagram showing a major fluid logic circuit, embodying the subcircuits of FIGS. 20 and 21, for controlling the position of one of the horizontally movable carriages.

FIG. 22 illustrates a logic circuit for translating the outputs of the DRN circuits described above for carriage 17 that moves parallel to the X axis into signals that control the operation of the motor MX that drives carriage 17 and that operates brake 33; operation of the circuit of FIG. 22, for illustrative purposes, will be discussed in connection with carriage 17. An identical logic circuit is provided for translating the outputs of the DRN circuits that compare signals from the tape and from the drums of transducer 38 associated with carriage 15, into signals for controlling operation of motor MY and its brake 33 associated with carriage 15.

Motor MX is controlled according to the position of a known four-way, three position hydraulic valve 138. Hydraulic fluid to drive motor MX is supplied through conduit 27 to valve 138. Valve 138 is actauted to a first position by a signal from interface element 140 to cause motor MX to be driven in one direction and is actuated to a second position by a signal from interface element 141 to cause the motor to be driven in the opposite direction. In the absence of a signal from either element 140 or element 141, the valve is in a third or closed position, shown in FIG. 22, and motor MX does not rotate.

The rate of flow of hydraulic fluid to and from motor MX and, therefore, the rate of rotation of the motor and rate of travel of the carriage, is controlled by a two position valve 144 and associated variable flow restrictors 146 and 147. Restrictor 146, for example, is adjusted to provide a relatively high flow of fow and a relatively high speed of motor MX while restrictor 147 is adjusted to provide a relatively low rate of flow and speed of motor MX. Flow is directed through one or the other of restrictors 146, 147 according to the position of valve 144. Valve 144 is preferably biased by a spring 148 to cause low speed rotation of motor MX. Valve 144 is positioned to cause high speed rotation of motor MX by a signal from interface element 150; high speed operation continues only so long as there is a signal from element 150.

Carriage brake 33 is applied in response to a signal from interface element 152 to halt movement of the carriage.

In the circuit of FIG. 22 various commands from the tape are combined with the outputs of the DRN circuits described above to control elements 140, 141, 150 and 152 that determine the movement, direction and rate of movement, and brake application for the carriage being controlled.

As described above, the output of each DRN circuit is a signal when a particular digit from the X-word for carriage 17, (or Y-word for carriage 15) on tape matches the corresponding digit from the appropriate position transducer. In FIG. 22 the signals from the DRN circuits are inverted in inverters 155 and entered into AND gate 156. The output of gate 156 is a signal when the output of each DRN circuit is a signal. A signal from AND gate 156 thus indicates a match between the X-word on tape and the actual position of the corresponding carriage.

To control the movement and direction of movement of motor MX the output of gate 156 is an input to AND gates 158 and 159 with the direction of travel command from row 6 of the tape and with the end of block indication from row 24 of the tape. If the tape is positioned so that a full block of information can be read and the output of gate 156 is not a signal, the output of gate 158 or of gate 159, but not both, will be a signal according to whether the tape commands one or the other direction of travel. If the output of gate 158 is a signal, element 140 will position valve 138 to cause motor MX to rotate in one direction and if the output of gate 159 is a signal element 141 will cause motor MX to rotate in the opposite direction.

If the output of gate 156 is a signal or if there is no "end of block" indication from the tape, neither gate 158 nor gate 159 will provide a signal output and motor MX will not rotate in either direction. This condition will occur, for example, when the tape is being indexed to a new position or when the carriage has moved to the commanded position and is at rest there.

The rate of carriage travel is determined by the command from row 7 of the tape which is passed through inverters 161 and 162 to provide a signal or no signal to element 150 which controls valve 144 as described above. The rate of travel command is, of course, ineffective if the carriage is not being commanded to move by a signal to either element 140 or element 141.

The carriage brake 33 is applied or released according to commands in rows 8 and 9 of the tape. A command in row 8 to apply the brake is directed to OR gate 163 which produces a signal from inverter 164 to element 152 to cause the brake to be applied.

A command to apply the brake is programmed in row 9 if it is desired to apply the brake only after a match is detected between the X word from tape and the actual position of X carriage 17. A command in row 9 is inverted in inverter 165 and entered into AND gate 166 along with the output of AND gate 156. AND gate 166 produces an output signal only when a command is present in row 9 of the tape and when AND gate 156 indicates a match between the X word on tape and the position of carriage 17. In that case the signal from AND gate 166 passes through OR gate 163 and inverter 164 to element 152 to command brake 33 to be applied.

The output of AND gate 156 is sent to inverters 169 and 170 and the outputs of those inverters are supplied to other circuits to be described below.

An identical circuit between the DRN circuits, motor MY, and brake 33 for Y carriage 15 operates in a similar manner from the tape program associated with Y carriage 15, and hence requires no further explanation.

ILLUSTRATIVE PROGRAMMED CYCLES

FIGS. 23 and 24 illustrate typical series of programmed blocks of commands supplied to the machine tool. FIG. 23 illustrates a typical program when the machine is used for drilling, while FIG. 24 illustrates a typical program when the machine is used for milling. Both drilling and milling require use of a cutting tool held in a rotating spindle and means for holding and moving a workpiece on the work table in relation to the rotating tool; to perform effective work there must be relative motion between the tool and the work in at least one plane.

In a drilling machine, during cutting it is normal for the work to be held from movement in any direction and the drill to rotate and move in a direction coincident with its centerline of rotation. Usually, the work piece must be moved into drilling position to locate the drilled hole, either because the workpiece is loaded in a position other than its drilling position or because holes are to be drilled on the workpiece in more than one position. Furthermore, at a given setting of the drill spindle and work, cutters of more than one type or size are often used so that the spindle rotation must be halted for tool changes. FIG. 23 outlines a series of programmed steps that might be taken by a drilling machine to permit or accomplish desired operations of these types.

In a milling machine, a workpiece normally is secured to a linearly moving work table to be moved into the path of a rotating cutter for effective metal removal. The outline of programmed steps in FIG. 24 illustrates a simple milling cycle.

Referring to FIG. 23, commands are shown in the rows of five sequential blocks, numbered for illustration as block numbers 1 to 5. The illustrative carriage positions are 14.000 for X carriage 17 and 7.500 for the Y carriage 15, before the commands in block 1 are carried out. The commands in block 1 indicate that the X carriage is to move rapidly in the plus direction to approach its commanded position, while the Y carriage is to move rapidly in the plus direction to approach its commanded position. After both X and Y carriages reach their commanded positions the tape is to be automatically indexed to the next block of information.

The commands in block 2 indicate that both the X and y carriages are to approach their commanded positions slowly and after reaching their positions their respective brakes are to be applied. The Z carriage 13 is commanded to move down and the spindle to run to perform a work operation on the workpiece.

At the end of the work operation the Z carriage returns to its uppermost position which causes the tape to be indexed to the next block of information in a manner to be described below.

The next commands in block 3 indicate that the next X and Y carriages are to remain in the positions previously assumed with the Z carriage remaining in its up position and the spindle not running. In this condition a tool change may be made. After the tool change the tape can be manually indexed to the next block of information.

The information on block 4 indicates that the X and Y carriages are to remain in their previously assumed positions while the Z carriage is moved down and the spindle commanded to run to perform a work operation on the workpiece with the newly installed tool. After a work operation the Z carriage automatically returns to its up position. The tape is indexed to the next block of information by the Z carriage assuming its up position.

The commands in block 5 indicate that both the X carriage and Y carriage are to move rapidly in the minus direction to their initial positions where, for example, a new workpiece may be supported on the carriages.

Referring now to FIG. 24 to illustrate a typical sequence when the machine is used for milling, illustrative carriage positions before the commands in block 1 are carried out are 10.000 for the X carriage and 5.000 for the Y carriage. The commands in block 1 indicate that both the X carriage and the Y carriage are to move rapidly in the plus direction to the commanded positions. After both carriages have reached their commanded positions, the tape is to be automatically indexed to the next block of information.

The commands in block 2 show that the X carriage is to maintain its previous position while the Y carriage is to move slowly in the plus direction to its commanded position. After the Y carriage reaches its commanded position, its brake is to be applied. At this point for a milling operation the Z carriage may be manually moved down to a cutting position and left there. The tape may then be indexed manually to the next block of information.

The information in block 3 shows that the Y carriage is to maintain its previous position while the X carriage is to move slowly in the plus direction toward the commanded position. The spindle is commanded to run and, since the Z carriage has been moved down and left in that position, movement of the X carriage causes a milling operation to be performed as the X carriage moves toward its commanded position. When the X carriage reaches its commanded position the tape is indexed automatically to the next block of information.

The information in block 4 shows that the X carriage and the Y carriage are to maintain their previous positions. The spindle is commanded to stop and, at this point, the Z carriage may be moved up manually and the tape may be indexed manually to the next block of information.

The information in block 5 indicates that the X carriage and the Y carriage are to move rapidly in the minus direction to their initial positions where the previous workpiece may be removed from the carriages and a new workpiece supported thereon. Thus, by the steps shown in FIG. 24 the X carriage and the Y carriage move from an initial position where a workpiece is positioned thereon to a cutting position where the Y carriage is braked and the X carriage is then commanded to move at the slow rate to cut to a predetermined position.

In the examples just described, tape indexing to present new blocks of information to the machine tool was initiated in one of three ways, all of which will be described more fully below in terms of the apparatus employed. Coded information in row 19 commands the tape to index automatically after commanded X positions and Y positions have been reached by apparatus to be described below.

The tape may also be indexed manually by apparatus to be described below. The tape will also be indexed automatically after the Z carriage has proceeded through its downward motion and has returned to its uppermost position, in a manner and by apparatus to be described below.

VISUAL INDICATION

As shown in FIG. 10, in block diagrammatic form, coded information from the tape reader R is decoded into numeric or decimal sequential series in circuit 65, and then fed into a readout driver 66 and finally a readout unit 67.

Figures 25, 26:
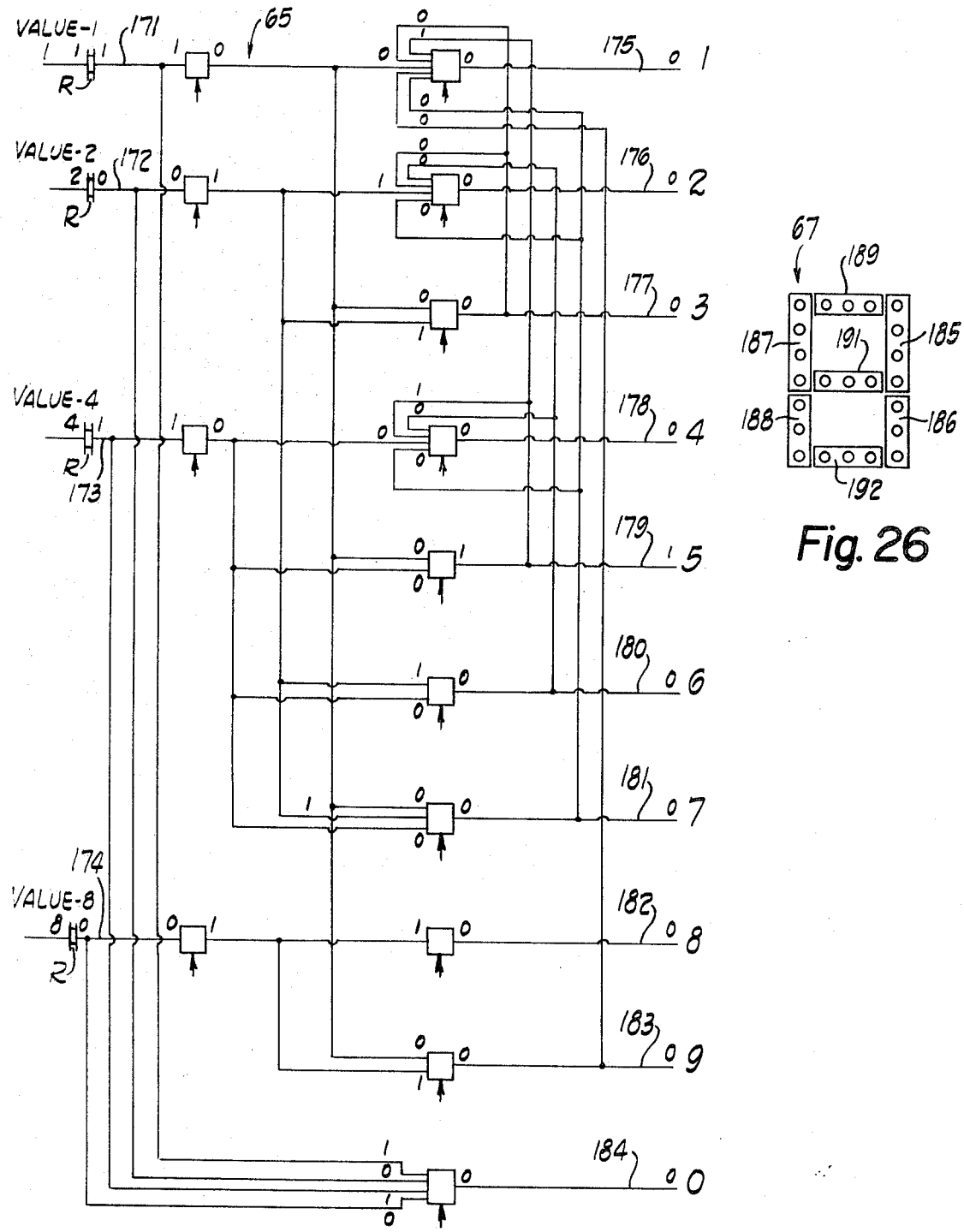
FIG. 25 is a diagram illustrating the circuit for the visual read-out system shown in FIG. 10.
FIG. 26 is a schematic representation of the read-out element for giving a visual reading of a digit that is read from the tape by the circuit of FIG. 25.

FIG. 25 is a diagram of the decoder 65. The signals with values of 1, 2, 4 and 8 are separately or in combination generated in the tape reader R, in row 21 for example, and presented to the decoder in lines 171, 172, 173 and 174. The illustrated circuit has output lines 175 to 184, connected to readout driver 66; a signal in line 175 represents digit "1," in line 176 digit "2" and so on to line 184 in which a signal represents "0." In the particular case illustrated by signal indications "1" and "0" at the inputs and outputs of elements, in FIG. 25, to illustrate a readout of digit "5" the input from the tape reader R is a signal of a value 1 at line 171 and a signal of a value 4 at line 173. There are no signals of values 2 and 8 in lines 172 and 174. The output is a signal at line 179 representing the value 5. There are no signals at any other combination of output lines representing digits 1, 2, 3, 4, 6, 7, 8, 9 and 0.

A signal, such as in line 179 representing the digit 5, is fed into the readout driver 66 and thence into readout unit 67 indicated in FIG. 26. Both of these items are readily available commercial items. The readout driver, for example, may be Fluidic Readout Drive, Part No. 6090009 manufactured by Pitney-Bowes Company, and readout unit may be Fluidic Readout, Part No. 6070, also manufactured by Pitney-Bowes Company, both shown in their catalogue 5294. The illustrated readout unit has a 5 × 7 matrix of floating pistons driven into and out of the field of view. Numeric displays are generated by the use of a seven-bar code. There are seven groups of points within the matrix as shown by reference numerals 185 through 192; combinations of these groups make a recognizable numeric display in a known manner.

If desired, there can be a readout system for each of lines 21 and 22 of the tape information block.

ADJUSTMENT OF CARRIAGES

If it should be desired to move either carriage 15 or 17 and its associated transducers manually along the axis of movement of the carriage, this can be done by rotating the shaft of the motor MX or MY, and hence its associated screw member 28, by engagement of the flats 37 with a wrench or crank (FIG. 5). In such case the clutch 42 is normally engaged to transmit motion from the screw member to the shaft 41 of the associated transducers 38. Such adjustment turning of the motor shaft will move the carriage along its axis and turn the associated drums A, B and C proportional amounts.

However, it is sometimes desirable to change the relationship between the carriage and its transducer drums. This can be accomplished by disengaging the clutch 42, then engaging the brake 33 with the screw member to prevent turning of the screw member, and then turning the transducer drums by the engagement of the flats 43 on transducer shaft 41 by a wrench or crank. After the desired relationship of the drums to the carriage is achieved, brake 33 is released and clutch 42 is re-engaged. This same change can also be effected by releasing clutch 42, applying brake 44 and turning the screw member by flats 37 on the motor shaft. After obtaining the desired position of the carriage, the brake is released and the clutch is re-engaged.

Figure 27:
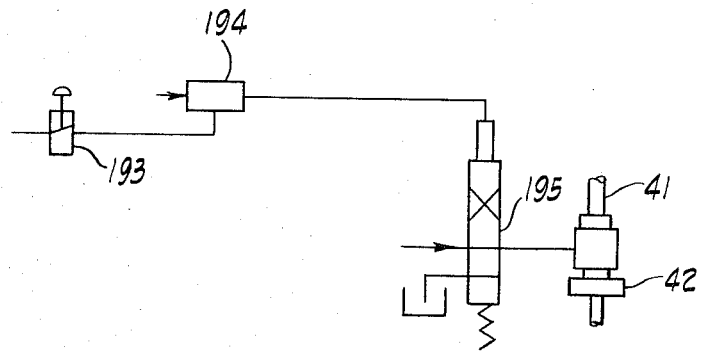
FIG. 27 is a diagram of a partial circuit for controlling one of the clutches of the drive system shown in FIG. 5.

FIG. 27 shows a schematic circuit of pressure and hydraulic control elements that allows a manually operated fluidic switch 193, controlling an interface element 194, to control spring biased hydraulic valve 195 to disengage its associated transducer driving clutch 42 when required.

SYSTEM FOR CONTROLLING OPERATION OF TOOL SPINDLE

As is shown in FIGS. 1, 2 and 3, the third carriage 13 rotatably carries a member 196 having several sides 197, four in the illustrated embodiment. Each side has adjustably positioned members 198, that actuate speed and direction controls 199 of the fluid operated cylinder MZ that moves the slide 13 along its vertical axis.

Figure 28:
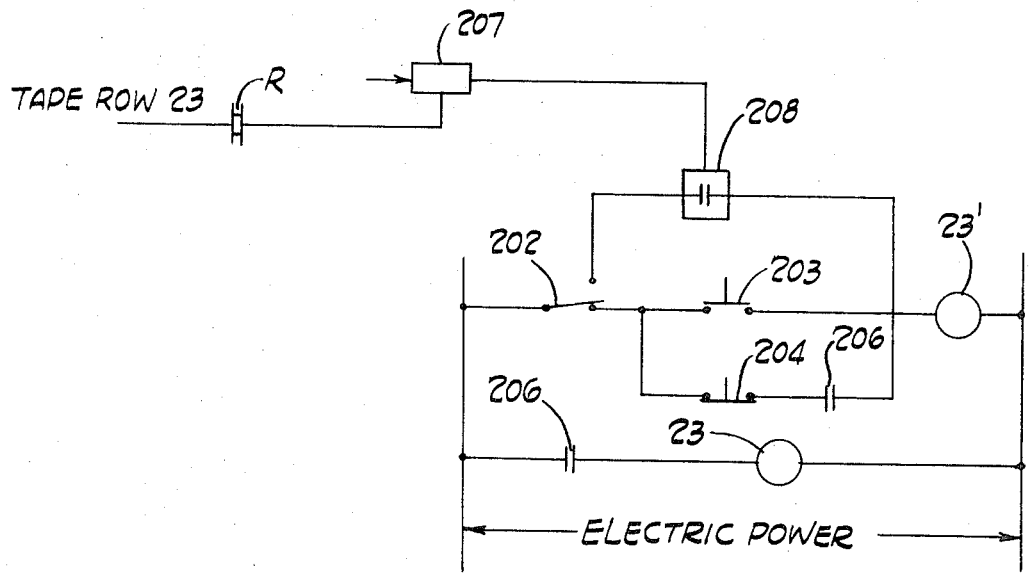
FIG. 28 is a diagram of a partial circuit for controlling the operation of the tool spindle drive motor.

FIG. 28 depicts a schematic diagram of the control for the spindle drive motor 23. There are two modes of operation, automatic and manual, as determined by an electrical selector switch 202 mounted with other operator controls (FIG. 2). Motor 23 may be manually started and stopped by operation of two pushbuttons 203 and 204, motor starter 23' and the conventional motor starting circuit shown. Starter 23' actuates conventional contacts 206 to provide a current path to motor 23. The current path may be interrupted by depressing pushbutton 204. In automatic mode, information in the form of coded holes in row 23 of the block of information on the tape, as shown in FIG. 8, as read by reader R, determine the presence or absence of a pneumatic signal to actuate through interface element 207, an automatic switch 208 to start or stop the spindle 12.

Figure 29:
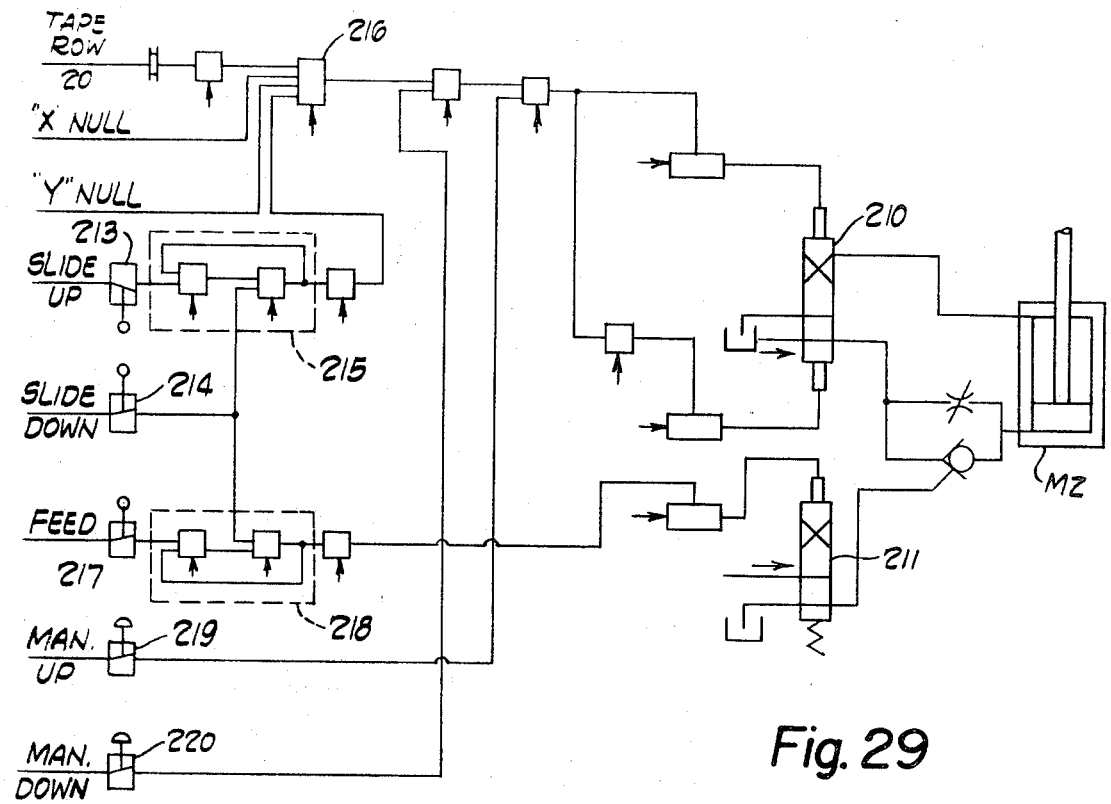
FIG. 29 is a diagram of the circuit for controlling the operation of the spindle carriage.

FIG. 29 shows a schematic diagram of low pressure pneumatic and hydraulic elements that direct regulated hydraulic liquid flow to move carriage 13 that carries the spindle 12. In normal operation by tape command, coded information in row 20 of a block of information on the tape (FIG. 8) will produce a signal through the tape reader R that causes the indicated hydraulic valves 210 and 211 to be positioned to cause movement of the piston of cylinder MZ in the down direction at a rapid rate. An effective signal will be produced by the coded information in row 20 only when certain other signals or absence of signals are present from elements 169 (FIG. 22) which indicate a position null for carriage 17 and a position null for carriage 15. No signal from these elements denotes that the horizontal carriages 15 and 17 are in position and that null condition exists. Limit valves 213 and 214 (forming part of controls 199), provide signals to control a flip-flop 215 which indicates when the Z carriage is up or down. When there is no signal from elements 169 and no signal from flip-flop 215 there will be a signal from AND gate 216 that will actuate the piston of cylinder MZ to move carriage 13 in a down direction.

When the carriage 13 has traveled at a rapid traverse rate to a suitably preset distance, operating contact is made with the start-feed limit valve 217, forming part of controls 199, which controls a flip-flop 218 (FIGS. 1, 29) to change the rate of movement to an adjustable slow or feed rate. After continued movement for an adjustable preset distance at this rate, operating contact is made with the "slide down" limit valve 214, which changes the states of flip-flops 215 and 218. This causes the hydraulic valves 210, 211 to be set, through the fluidic circuit, to cause the cylinder MZ to move carriage 13 upward at a rapid rate until it comes to its uppermost position, and operates limit valve 213.

There are also two manual operating controls 219, 220 mounted with other operator controls as shown in FIGS. 1 and 2. They provide manual means for starting of carriage 13 movement in a down direction and manual means to cause the carriage to move up at any time the proper meanual control is actuated.

SYSTEM FOR INDEXING TAPE

Figure 30:
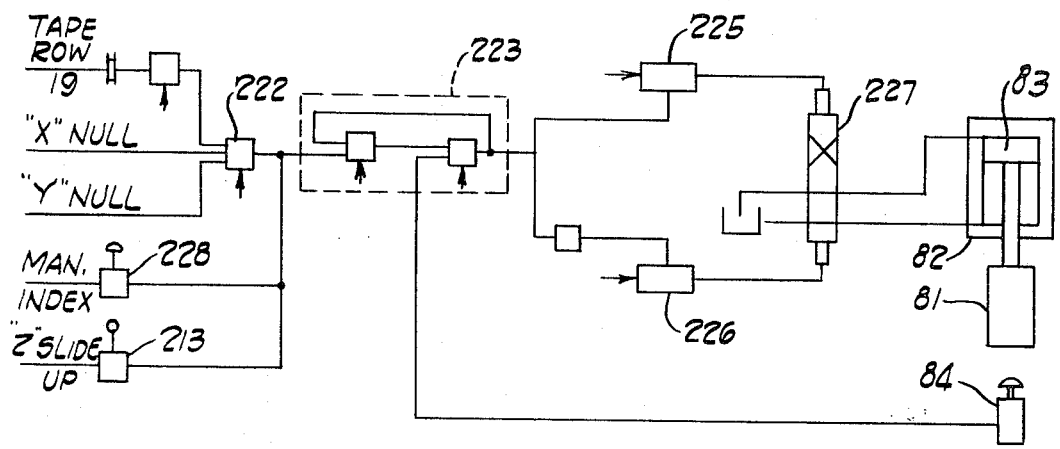
FIG. 30 is a diagram of the circuit used for controlling the operation of the tape index cylinder.

FIG. 30 illustrates the fluidic circuit for operating piston 83 of the cylinder 82 that actuates the rack 81 that moves the tape so that one block of information is moved away and another block of information is moved into the tape reader.

Tape indexing may be initiated in any one of three ways. Coded information from tape row 19 is entered into AND gate 222 along with null position indications from elements 169 (FIG. 22) for the X and Y carriages. An index command from the tape in conjunction with an X position null and Y position null controls a flip-flop 223 which in turn controls a valve 227 through interface elements 225 and 226 to cause piston 83 to index the tape. At the end of the index stroke the extended rack 81 activates limit valve 84 which restores flip-flop 223 to its initial condition to initiate withdrawal of piston 83.

The tape may be indexed manually, at will, by actuating valve 228 which also controls flip-flop 223.

The tape is also indexed whenever limit valve 213 is actuated indicating that the Z carriage has returned to its uppermost position. This will occur when, as described above, the tape commands the Z carriage to operate after an X position null and a Y position null and the Z carriage has returned to its uppermost position, acuating valve 213.

In the illustrated apparatus, the above indicated fluid logic elements that transmit output signals when there are no input signals operate on fluid pressures so low that the ouput pressures do not act as sources of fluid power but merely as signals that ultimately through interface elements control sources of fluid power at considerably higher pressures. Consequently, it is not necessary to construct parts of the apparatus or circuit means handling such low pressure signals, such as the transducer drums and their readers, so that they are sealed against leakage of high pressure power fluids, since only low pressure fluids are concerned and then only low pressure fluid signals are involved.

Moreover, according to the present invention, use of electric-actuated logic elements may be completely avoided, with attendant difficulties that may arise from instability of circuit operations due to fluctuations or stoppages in electrical current or fluctuations in voltages or from wear or contamination of circuit elements such as relays. By means of the present invention the counting systems used in conventional electric-operated systems for numerical control of machine tools can be completely avoided, with the attendant difficulties that often arise in the event of current fluctuations or stoppage, or voltage fluctuations.

So long as clean air or other suitable fluid used is provided at suitable pressure, systems embodying the invention can be operative. If the air or other fluid is supplied from storage tanks to avoid interruptions that might arise in the even of breakdowns in fluid pressurizing pumps, added insurance against stoppage is provided.

Various changes may be made in the illustrated apparatus.

Fluids other than those indicated above may, of course, be used, and at pressures different from those indicated.

Other types of fluid logic elements than those indicated may be used, those indicated being purely for purposes of illustration.

Other types of input records than those disclosed above may be used, including those in the form of a strand other than a tape as illustrated.

Moreover, while apparatus for drilling and milling has been described for illustrative purposes, it is apparent that the invention may be employed in other types of machine tools. Machine tools usually embody two holders, one a work holder and one a tool holder that are moved relatively to each other to effect the desired machining; when, as indicated above, the tool holder rotates the tool and the work is not rotated, the machine is generally described as a drill press or a milling machine depending on whether the tool cuts a hole or machines a surface. It is obvious that the invention may be employed in machines where the work is rotated and the tool is stationary, as in lathes. Where a holder is used that rotates a tool or the work, the holder may or may not be moved along a line coincident with the axis of rotation. The invention, therefore, may be applied to a variety of machine tools such as drill presses, milling machines, lathes, boring machines, grinders, as well as other machines.

Modifications other than those indicated above may be made without departing from the invention.

What is claimed is:

1. In machine tool apparatus, a tool holder, a work holder, said holders being relatively movable to permit a tool in the tool holder to perform a work operation on a workpiece in the work holder, program input means for providing a positioning instruction in the form of low pressure fluidic signals to at least one of said holders, said positioning instruction including a position to be assumed by said instructed holder and a direction and rate of travel to cause said instructed holder to reach the position to be assumed, a member movable in fixed relation to movement of said instructed holder for continually providing information as to the position of said instructed holder in the form of low pressure fluidic signals, means utilizing said positioning instruction signals and said position information signals for comparing said position information fluidic signals to said fluidic signals representing said position to be assumed, and means for moving the instructed holder in response to a mismatch between said position information and said position to be assumed.

2. In machine tool apparatus, a tool holder, a work holder, said holders being relatively movable to permit a tool holder to perform a work operation on a workpiece in the work holder, program input means for providing a positioning instruction in the form of low pressure fluidic signals to at least one of said holders, said positioning instruction being provided to one of said holders to designate a position to be assumed thereby and a direction and rate of travel of said holder, a member movable in fixed relation to movement of said instructed holder for continually providing information as to the position of said instructed holder in the form of low pressure fluidic signals, means utilizing said positioning instruction signals and said position information signals for comparing said position information to said position to be assumed, means for moving the instructed holder in response to a mismatch between said position information and said position to be assumed, said program input means providing instruction to enable a work operation to be performed on said workpiece, means for causing said work operation to be performed in response to said work operation instruction and to correspondence between said position to be assumed and said position information, said work information instruction being provided to said tool holder to cause it to perform a work operation on said workpiece in response to correspondence between said position information and said position to be assumed.

3. Apparatus as claimed in claim 2 wherein said positioning instruction is provided to said workholder to designate a position to be assumed thereby and a direction and rate of travel of said workholder, and said work operation instruction is provided to said toolholder to cause it to perform a work operation on said workpiece in response to correspondence between said position information and said position to be assumed.

4. In machine tool apparatus, a tool holder, a work holder, said holders being relatively movable to permit a tool in the tool holder to perform a work operation on a work piece in the work holder, program input means for providing a positioning instruction in the form of low pressure fluidic signals to at least one of said holders, means associated with said instructed holder for providing information as to its position in the form of low pressure fluidic signals, said means for providing position information including a driven member that rotates in fixed relation to movement of said holder being positioned, said driven member having patterned spaced holes coded to indicate the positions of said holder being positioned, means utilizing said positioning instruction signals and said position information signals for comparing said position information to said positioning instruction, and means for moving the instructed holder in response to a mismatch between said position information and said positioning instruction.

5. Apparatus as claimed in claim 49 wherein said position comparing means includes circuit means embodying low pressure fluidic signal responsive devices that produce a low pressure fluidic output signal condition when the signals representing said position information correspond to the signals representing said position instructions.

6. Apparatus as claimed in claim 4 wherein said program input means provides instruction to enable a work operation to be performed on said workpiece and wherein said apparatus further comprises means for causing said work operation to be performed in response to said work operation instruction and to correspondence between said positioning instruction and said position information.

7. Apparatus as claimed in claim 4 comprising two carriages, one movable along a first axis and the second carriage movably mounted on said first carraige for movement along an axis transverse to said first axis, said second carriage carrying said work holder, said program input means providing positioning instructions to each of said carriages, a pair of driven members rotatable in fixed relation with movement of each respective carriage for providing information as to the position of each carriage, means for comparing the position of each of said carriages to its positioning instructions, and means for moving each carriage in response to a mismatch between its position and its positioning instructions.

8. Apparatus as claimed in claim 7 wherein said carriages are movable along mutually perpendicular axes to position said workpieve with respect to said toolholder, said program input means providing a motion instruction to said toolholder, and means for causing a work operation to be performed on said workpiece in response to said motion instruction and to corresponding between the position information and the positioning instructions of both said carriages.

9. Apparatus as claimed in claim 4 further comprising reader means having an array of holes related to and adapted to be aligned with holes in said driven member, and means for directing low pressure fluidic flow through holes aligned in said reader means and said driven member to produce low pressure fluidic signals indicative of the position of said holder being positioned.

10. Apparatus as claimed in claim 4 wherein said program input means includes an input record medium in the form of strand material.

11. Apparatus as claimed in claim 11 wherein said input record medium has a series of blocks of information including said instructions recorded thereon, said information including unique identification for each block, and further comprising means for providing a visual display of said block identification.

12. Apparatus as claimed in claim 4 wherein said program input means includes an input record medium haivng said instructions recorded thereon in the form of holes, and means for reading said holes to provide said instructions to said holders in the form of low pressure fluidic signals.

13. The apparatus as claimed in claim 12 wherein said reading means includes an array of holes related to and adapted to be aligned with holes in said input medium such that fluidic flow is permitted through said members and said medium when the repsective holes are aligned.

14. The apparatus as claimed in claim 12 wherein said input record medium is flexible tape having said instructions punched thereon.

15. Apparatus as claimed in claim 12 wherein said input record medium has a series of blocks of information including said instructions recorded thereon, said information including unique identification for each block, and further comprising means for providing a visual display of said block identification.

16. Apparatus as claimed in claim 12 further comprising drive means for moving said input record medium predetermined distance to present new instructions to said holders.

17. Apparatus as claimed in claim 16 further comprising manually operable fluidic signal producing means for initiating operation of said drive means.

18. In machine tool apparatus, a member movable in a path and means for producing low pressure fluidic signals indicating the position of said movable member, said signal producing means including a driven rotatable member coupled to said movable member for rotation in fixed relation to movement of said movable member, said driven member having a series of patterned spaced holes coded to represent the position of said movable member, reader means cooperating with said driven member and having patterned spaced holes related to and adapted to be aligned with holes in said driven member, and means for directing low pressure fluidic flow through aligned holes in said reader means and said driven member to produce low pressure fluidic signals indicative of the position of said movable member.

19. Apparatus as claimed in claim 18 further comprising means for altering the position of said driven member with respect to the position of said movable member.

20. Apparatus as claimed in claim 18 wherein said driven member comprises a cylindrical drum having a series of circumferentially spaced rows of holes, each of said rows forming a code that indicates a circumferential distance from a starting point on said drum, said drum rotating in fixed relation with movement of said movable member to indicate the position of said movable member.

21. In machine tool apparatus, a tool holder, a work holder, said holders being relatively movable to permit a tool in the tool holder to perform a work operation on a workpiece on the workholder, program input means for providing instructions in the form of low pressure fluidic signals to at least one of said holders, said instructions including a direction and rate of travel for said instructed holder and a position to be assumed thereby and a work operation instruction, a member movable in fixed relation to movement of said instructed holder for continually providing information as to the position of said instructed holder in the form of low pressure fluidic signals, means utilizing said signals representing said position to be assumed and said position information signals for comparing said position information to said position to be assumed, means for moving said instructed holder in response to a mismatch between said position information and said position to be assumed, and means for causing said work operation to be performed in response to said work operation instruction and to correspondence between said position to be assumed and said position information.

22. The apparatus as claimed in claim 21 further comprising means for providing a visual display of at least a portion of said instructions.

23. In a logic element control circuit for controlling movement of movable members of a machine tool, means for providing low pressure fluidic signals representative of operation instructions for said movable members, said operation instructions including position instructions, direction of travel instructions and rate of travel instructions for a first of said movable members, fluidic circuit means repsonsive to said position instructions for causing movement of said first member toward said instructed position, means including a member movable in fixed relation to movement of said first member for continually providing low pressure fluidic signals representative of the acutal position of said first member, and fluidic circuit means for causing movement of said first member to be terminated in response to correspondence between said position instruction signals and said actual position signals.

24. In a logic element control circuit for controlling movement of movable members of a machine tool, means for providing low pressure fluidic signals representative of pre-programmed storable operation instructions for said movable members, said operation instructions including position instructions, direction of travel instructions and rate of travel instructions for at least one of said movable members, fluidic circuit means responsive to said position instructions for causing movement of the instructed members toward their instructed positions, means for continually providing low pressure fluidic signals representative of the changing actual positions of said instructed members, and fluidic circuit means for causing movement of said instructed members to be terminated in response to correspondence between said position instruction signals and said actual position signals for each of said instructed members.

25. In a logic element control circuit for controlling movement of movable members of a machine tool, means for providing low pressure fluidic signals representative of pre-programmed storable operation instructions for said movable members, said operation instructions including position instrcutions for at least one of said movable members, fluidic circuit means responsive to said position instructions for causing movement of the instructed members toward their instructed positions, means for continually providing low pressure fluidic signals representative of the changing actual positions of said instructed members, fluidic circuit means for causing movement of said instructed members to be terminated in response to the correspondence between said position instruction signals and said actual position signals for each of said instructed members, said preprogrammed storable operation instructions for said movable member including further instructions for causing movement of at least one other movable member after movement of said instructed members has been terminated in response to coincidence between said position instruction signals and said actual position signals.

* * * * *